United States Patent
Botros et al.

(10) Patent No.: US 12,183,107 B2
(45) Date of Patent: Dec. 31, 2024

(54) SIGNAL-BASED MACHINE LEARNING FRAUD DETECTION

(71) Applicant: Onfido Ltd., London (GB)

(72) Inventors: Philip Botros, London (GB); Romain Sabathe, London (GB); Elizabeth Christiansen, London (GB); Slavi Bonev, London (GB); Roberto Annunziata, London (GB); Mohan Mahadevan, London (GB)

(73) Assignee: Onfido Ltd., London (GB)

( * ) Notice: Subject to any disclaimer, the term of this patent is extended or adjusted under 35 U.S.C. 154(b) by 385 days.

(21) Appl. No.: 17/830,206

(22) Filed: Jun. 1, 2022

(65) Prior Publication Data

US 2022/0398859 A1 Dec. 15, 2022

(30) Foreign Application Priority Data

Jun. 14, 2021 (EP) .................................. 21179303

(51) Int. Cl.

| | |
|---|---|
| *G06V 10/77* | (2022.01) |
| *G06N 3/08* | (2023.01) |
| *G06V 10/82* | (2022.01) |
| *G06V 10/98* | (2022.01) |
| *G06V 30/416* | (2022.01) |

(52) U.S. Cl.
CPC ............. *G06V 30/416* (2022.01); *G06N 3/08* (2013.01); *G06V 10/7715* (2022.01); *G06V 10/82* (2022.01); *G06V 10/98* (2022.01)

(58) Field of Classification Search
None
See application file for complete search history.

(56) References Cited

U.S. PATENT DOCUMENTS

| | | | |
|---|---|---|---|
| 7,590,344 | B2 | 9/2009 | Petschnigg |
| 7,672,475 | B2 | 3/2010 | O'Doherty et al. |
| 8,025,239 | B2 | 9/2011 | Labrec et al. |
| 8,786,767 | B2 | 7/2014 | Rihn et al. |
| 9,058,535 | B2 | 6/2015 | Guigan |

(Continued)

FOREIGN PATENT DOCUMENTS

| | | |
|---|---|---|
| DE | 102018102015 A1 | 8/2019 |
| FR | 2977349 A3 | 1/2013 |
| WO | 2021044082 A1 | 3/2021 |

*Primary Examiner* — Tsung Yin Tsai
(74) *Attorney, Agent, or Firm* — Cesari and McKenna, LLP

(57) ABSTRACT

Described are methods and systems for training a machine learning (ML) model to detect anomalies in images of documents. A first image of a first set of images of documents is obtained. Each first image relates to a region of the document and the first set of images comprises an image of a document containing an anomaly and an image of a document not containing an anomaly. Signal processing algorithms are applied to the first images to generate a signal for each first image and each algorithm, and a discriminative power of each algorithm is evaluated. Based on the discriminative power, a signal processing algorithm is selected and ML model input data is generated using signals generated by applying the algorithm to second digital images. The ML model is trained using the input data to produce output indicating whether an image of a document contains an anomaly.

20 Claims, 21 Drawing Sheets

(56) References Cited

U.S. PATENT DOCUMENTS

| | | | |
|---|---|---|---|
| 9,081,988 B2 * | 7/2015 | Dolev | G06F 21/64 |
| 9,153,005 B2 | 10/2015 | Tremolada et al. | |
| 9,418,282 B2 | 8/2016 | Rutz et al. | |
| 10,019,626 B2 | 7/2018 | Schilling et al. | |
| 10,019,627 B2 | 7/2018 | Kutter et al. | |
| 10,043,071 B1 * | 8/2018 | Wu | G06V 30/413 |
| 10,127,454 B2 | 11/2018 | Pau et al. | |
| 10,354,142 B2 | 7/2019 | Arlazarov et al. | |
| 10,402,448 B2 | 9/2019 | Filgueiras de Araujo et al. | |
| 10,477,087 B2 | 11/2019 | Rivard et al. | |
| 10,621,426 B2 | 4/2020 | Gaubatz et al. | |
| 10,789,463 B2 | 9/2020 | Kutter et al. | |
| 10,872,488 B2 | 12/2020 | Azanza Ladron et al. | |
| 11,354,917 B2 * | 6/2022 | Martin | G06V 10/50 |
| 11,450,152 B2 * | 9/2022 | Ramachandra | G06V 40/172 |
| 2006/0281435 A1 * | 12/2006 | Shearer | G06K 19/0702 |
| | | | 455/343.1 |
| 2007/0041628 A1 | 2/2007 | Fan | |
| 2008/0158258 A1 | 7/2008 | Lazarus et al. | |
| 2014/0037196 A1 | 2/2014 | Blair | |
| 2014/0055824 A1 | 2/2014 | Tremolada et al. | |
| 2017/0132465 A1 | 5/2017 | Kutter et al. | |
| 2019/0213408 A1 | 7/2019 | Cali et al. | |
| 2019/0220660 A1 | 7/2019 | Cali et al. | |
| 2019/0392196 A1 | 12/2019 | Sagonas et al. | |
| 2020/0379868 A1 * | 12/2020 | Dherange | G06N 20/20 |
| 2021/0004580 A1 * | 1/2021 | Sundararaman | G06V 30/224 |
| 2021/0004949 A1 * | 1/2021 | Broyda | G06V 30/224 |
| 2021/0160687 A1 | 5/2021 | Ross et al. | |
| 2021/0200855 A1 | 7/2021 | Guigan | |
| 2022/0351532 A1 * | 11/2022 | Gietema | G06V 10/454 |

* cited by examiner

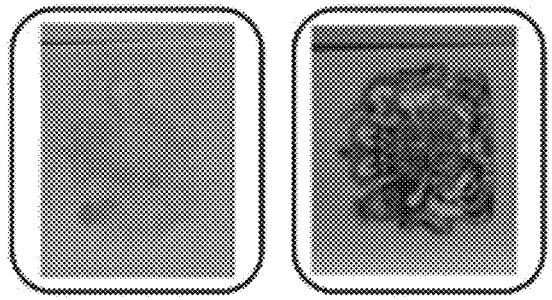
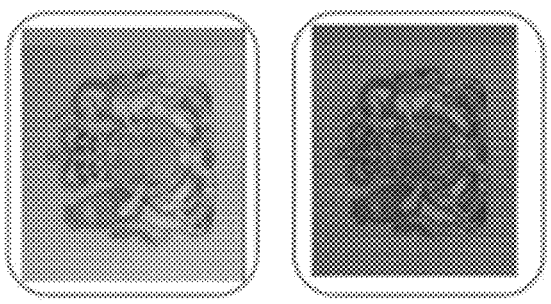
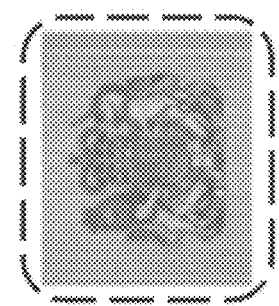
Fig. 5

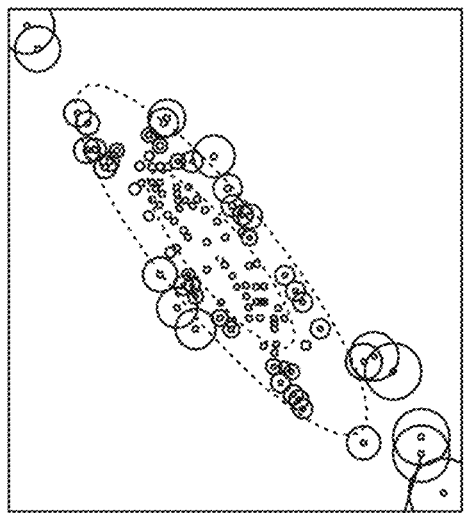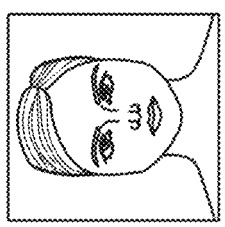
Fig. 10b
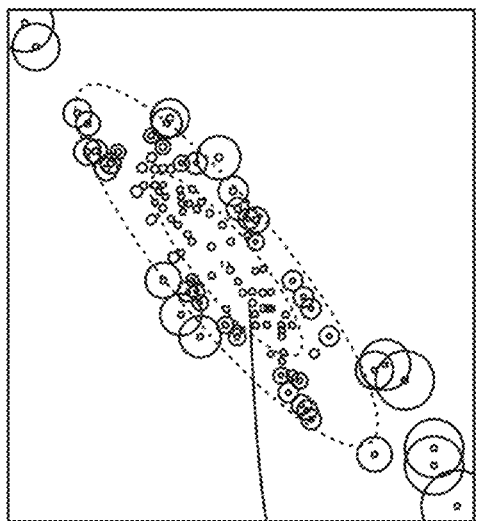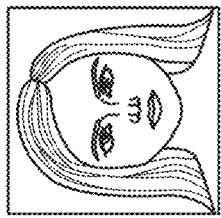
Fig. 10a

SIGNAL-BASED MACHINE LEARNING FRAUD DETECTION

RELATED APPLICATIONS

This application claims priority to European Patent Application No. EP21179303.9, filed on Jun. 14, 2021, which is incorporated herein by reference in its entirety.

TECHNICAL FIELD

The subject matter of the application relates generally to a method for detecting anomalies in images of a document. In particular, the disclosure relates to training a machine learning model for detecting anomalies in images of a document.

BACKGROUND

Digital identity verification systems require users to submit images of government issued documents remotely using mobile phones, computers or any other digital device. This information is then used to grant users access to services or products of different kinds such as online banking, brokering, conveyancing, property letting or car rentals. The remote nature of digital onboarding combined with the potential high value of these services leaves such verification systems open to fraudsters from around the world who may attempt to defraud the systems. For example, a fraudster may impersonate another person by tampering with identity documents, resulting in documents containing anomalies. There are, of course, other ways of digitally defrauding a system such as submitting false biometric data by impersonating someone else or intercepting results from a service provider to its clients and unauthorized tampering. However, the focus of the present application is on solving the problem of detecting anomalies in documents, wherein the anomalies may be indicative of fraudulent tampering with the documents.

A major problem with detecting anomalies in documents is that, as well as known fraud attacks, new fraud attacks are routinely employed in particular document types. It is therefore necessary to develop an anomaly detection mechanism that can rapidly deliver robust and automated solutions for detecting known and new types of document fraud attacks by detecting anomalies in a large set of diverse worldwide documents while using limited data and avoiding falsely detecting anomalies in documents not containing anomalies.

Machine learning is a powerful approach to solving a variety of anomaly detection problems. A key advantage of machine learning is its ability to learn from data. There are two major challenges when seeking to take advantage of the full potential of machine learning. The first is directing machine learning models to specifically learn the relevant parts of the information from the data—i.e., interpretability of the models—and the second challenge is to accomplish this task with limited amounts of data. These challenges become more pronounced considering the presence of noise sources in data, which can adversely affect the accuracy of anomaly detection.

There are currently two main approaches for detecting new fraud attacks of varying levels of sophistication. The first approach uses machine learning models with significant levels of customized human expert driven data augmentation to achieve the requisite levels of performance in production. The second approach involves the use of classical Computer Vision algorithms to build customized solutions for every problem.

A problem with the above approaches is that they require vast amounts of data and/or time and a group of highly skilled scientists to create individual solutions to each and every fraud scheme. This significantly hampers the extension of these approaches to different fraud mechanisms in different types of documents and limits the speed with which anomaly detection solutions can be delivered when a new fraud attack in a particular document or a particular type of documents is detected. There is therefore a need for a new automated approach that can rapidly deliver scalable and customized solutions.

SUMMARY

The invention, in one aspect, features a computer implemented method of training a machine learning model (for example, an artificial neural network, for example a convolutional neural network, a support vector model (SVM), a random forest, an isolation forest or any other supervised and unsupervised machine learning model) for detecting anomalies in images of documents of a class of documents—for example, British passports, American driver's licenses, French identity cards, etc.

In some embodiments, training the machine learning model to detect anomalies in an image of a document in a class of documents comprises three main stages: selecting signal processing algorithm(s), for example one or more of a spatial, temporal or spatio-temporal signal processing algorithm, applying the selected signal processing algorithm(s) to a set of digital images of documents in the class of documents to generate input data for the machine learning model, and training the machine learning model using the input data.

The first stage of selecting signal processing algorithm(s) involves selecting algorithms based on at least a discriminative power of each signal processing algorithm, the discriminative power being indicative of the power of the signals generated with the respective signal processing algorithm to discriminate images of documents of a class of documents containing an anomaly from images of documents of the class of documents not containing an anomaly. The selecting of algorithm(s) can, for example, be based on algorithms with the highest discriminative power or those with a discriminative power above a threshold.

As an example, while signal processing algorithms that involve the use of color information in one document type, say passports, may provide a high discriminative power for anomaly detection, they may not be as accurate in detecting anomalies in another document type, say driver's licenses.

Once one or more signal processing algorithms are selected, they are applied to a set of images of documents which contains images of documents not containing an anomaly and images of documents containing an anomaly from the class of documents in question. The application of signal processing algorithm(s) to these images generates signals that provide input data for the machine learning model. The machine learning model is then trained using this input data to predict whether an image of a document in the particular class of documents contains an anomaly or not.

The application of the one or more selected signal processing algorithm(s) to an image of a document effectively isolates "useful" signals in that document—useful in indicating whether the image of the document contains an anomaly or not, as indicated by the signal's discriminative power—which, when fed to a machine learning model, allows the machine learning model to learn the relevant parts of the information from the data. That is by selecting the most discriminative signal processing algorithm, the method directs the machine learning model to specifically learn the relevant parts of the information from the data rather than all information available, thus requiring significantly less data. Typically, machine learning models require tens of thousands or even millions of samples of input data, while the present method advantageously only requires as few as a hundred samples of input data. Because the method directs the machine learning model to specifically learn the relevant parts of the information from the data, the method also has the advantage of avoiding falsely detecting anomalies in images of documents that do not contain anomalies by learning the noisy parts of the information in the data rather than the relevant parts of the information from the data.

As well as ensuring that the machine learning model learns from specific predictive signals, the methods provided in this disclosure are capable of detecting anomalies even when only a small data set, i.e. a small number of images of documents of a particular class, are available. Thus a significant advantage of this focused nature of learning compared to existing training methods—which require very large datasets and careful training strategies—is that a high level of anomaly detection accuracy is achieved with only a limited amounts of data.

Selecting the one or more signal processing algorithm(s) based on the discriminative power of the respective one or more signal processing algorithms(s) starts with obtaining digital images of a set of documents of the class of documents that is of interest, e.g., passports, driver's licenses, resident permits, ID cards from a particular country or any other documents used for identification. It is noted that one set of digital images of documents of the class of documents is used for selecting signal processing algorithms and another set is used for training the machine learning model. Throughout the present disclosure, the set used for selecting algorithms, is referred to as the first set of digital images of documents and the set used for training the machine learning model is referred to as the second set. The second set can be the same as the first set of digital images of documents or it can be a different set of digital images of documents, though, of course, both the first and second set are of digital images of documents from the same class of documents, e.g., both are sets of passports from a particular nationality or sets of driver's licenses from a particular country. For example, the two sets can be overlapping, or the first set of digital images of documents can be a subset of the second set of digital images of documents.

The digital images of the first set of digital images of documents are denoted the first digital images and the digital images of the second set of digital images of documents are denoted the second digital images. The first digital images can be images of regions of documents within the class of documents, where a region can comprise a portion of or the whole document. The second digital images are images of the same regions of documents within the class of documents. That is, when the images of a region in a first set of digital images of documents—first digital images—are used for selecting the signal processing algorithm(s), images of the same region in the second set of digital images of documents—second digital images—are used for training the machine learning model. For example, where digital images of holograms on UK driving licenses are used for selecting signal processing algorithm(s), the machine learning model is trained using digital images of holograms on UK driving licenses.

Some of the images of documents in the first set of digital images of documents may contain an anomaly and some may not contain an anomaly, with at least one digital image of a document not containing an anomaly and at least one digital image of a document containing an anomaly being present in this first set. Images of documents that contain anomalies may comprise synthetic or real world anomalies. Anomalies in the images of documents may be due to anomalies in the actual documents (real fraud/real world anomalies) or due to anomalies introduced in the images themselves (synthetic fraud/synthetic anomalies).

A number of (at least two) signal processing algorithms are then applied to the first digital images to generate respective signals for each first digital image when each signal processing algorithm is applied to the image. These generated signals are then used to evaluate a discriminative power of each signal processing algorithm, where the discriminative power is indicative of the power of the signals generated with the respective signal processing algorithm to discriminate digital images of documents of the class of documents containing an anomaly from digital images of documents of the class of documents not containing an anomaly. One or more signal processing algorithm(s) are then selected for training the machine learning model based on at least their discriminative power.

In some embodiments, the discriminative power of a signal processing algorithm may be based on a distance measure between the signals generated with the respective signal processing algorithm for each first digital image of the at least one digital image of the document of the class of documents not containing an anomaly and the signals generated with the respective signal processing algorithm for each first digital image of the at least one digital image of the document of the class of documents containing an anomaly. The discriminative powers of the signal processing algorithms and, optionally, a plurality of metrics that correlate with the discriminative power, are then used as input to an automated decision engine, which may be a machine learning model or a predefined set of rules, and which selects one or more of the plurality of signal processing algorithms.

In order to train the machine learning model, the one or more selected signal processing algorithms are applied to digital images of the second set of digital images of documents—denoted second digital images—in the class of documents.

The digital images of documents in the second set may be digital images of documents containing an anomaly or digital images of documents not containing an anomaly, with at least one digital image of a document containing an anomaly and one digital images of a document not containing an anomaly. In a similar way to the first set of digital images of documents, each second digital image of a document in the second set of digital images of documents is an image of a region of that document. As noted earlier, this region is the same region for which the first digital images were obtained and for which the one or more signal processing algorithms were selected.

The application of the one or more selected signal processing algorithm(s) to the second digital images of the second set of digital images of documents generates signals that are used as input data for the machine learning model. This input data is then used to train the machine learning model to produce output data indicating whether a digital image of a document of the class of documents contains an anomaly or not.

In some embodiments, the signal processing algorithms may comprise a spatial signal processing algorithm. The signal processing algorithms may also comprise one or both of a temporal signal processing algorithm or a spatio-temporal signal processing algorithm.

In some embodiments, each first digital image may be a video frame of a video of a region of a document of the first set of digital images of documents and each second digital image may be a video frame of a video of a region of a document of the second set of digital images of documents within the class of documents. A video of a region of a document refers to a video in which each frame is an image of the respective region of the document. The video may be constructed by identifying the respective region in every frame of a video of the whole document and extracting a segment in the video frame that contains the region. The segment extracted can either be an exact match of the region or a segment that contains the region.

In some embodiments, applying a signal processing algorithm may comprise applying a spatio-temporal signal processing algorithm to each of the first digital images and second digital images, where the first digital image is a video frame of a video of a region of a document of the first set of digital images of documents. Applying a spatio-temporal signal processing algorithm may comprise: for each video frame in the respective video, computing a metric from pixel values in the video frame (for example, the average of the pixel values in the video frame) across each color channel, generating a sequence of metrics for each color channel for the respective video, generating a spectrum indicative of the frequency content of the sequence of metrics for each color channel for the respective video. Optionally, the respective signal may be the spectrum indicative of the frequency content of the sequence of metrics for each color channel for the respective video. Optionally, applying a spatio-temporal signal processing algorithm may further comprise computing additional metrics from the spectrum, where the additional metrics comprise one or more of maximum frequency with the power above a power threshold, minimum frequency with the power above a power threshold, frequency of peak power or temporal derivatives of frequencies, wherein the respective signal comprises the one or more additional metrics.

In some embodiments, applying a signal processing algorithm to the first digital images may comprise applying a filter that models a local noise pattern to each digital image to obtain a filtered image as the respective signal for each digital image. Applying a filter may, in turn, comprise convolving a kernel with each digital image.

Depending on the local noise, a kernel may be a one-dimensional filter or a two-dimensional filter or a series of one or two dimensional kernels.

In some embodiments, the kernel may be pre-defined or may be selected from a plurality of kernels based on the first digital images.

The kernels may be selected based on trial and error and/or experience by an operator and/or selected from a set of pre-determined algorithmic computations comprised in spatial signal processing algorithms, temporal signal processing algorithms and spatio-temporal signal processing algorithms.

In some embodiments, applying a signal processing algorithm to the first digital images may comprise applying image frequency analysis to each of the first digital images.

This, in turn, may comprise extracting spatial frequency information from each first digital image, normalizing the spatial frequency information, and generating a signal that is indicative of respective normalized spatial frequency information in each of a plurality of frequency bands. For example, the generated signal may be indicative of respective normalized spatial frequency information in a first frequency band, a second frequency band and a third frequency band. The first frequency band may be below a first normalized spatial frequency, the second frequency band may be above the first spatial frequency and below a second spatial frequency, and the third frequency band may be above the second spatial frequency. More generally, there may be any number of frequency bands. The spatial frequency information may be indicative of the power within each band. For example, the spatial frequency information may be the power or magnitude of the coefficients of the frequency analysis, for example, Fourier or wavelet analysis.

In some embodiments, applying a signal processing algorithm to the first digital images comprises extracting one or more edges of each of the first digital images to generate the respective signal for each first digital image. Optionally, extracting one or more edges of the first digital images comprises feeding each first digital image to a convolutional neural network to detect a plurality of corners of the first digital image, cropping each first image around the plurality of corners, applying edge detection to each of the cropped first digital images, and extracting an image of the plurality of corners of each of the first digital images to generate the respective signal for each first digital image. Examples of such convolutional neural networks are provided in A. Ajit, K. Acharya and A. Samanta, "A Review of Convolutional Neural Networks," 2020 International Conference on Emerging Trends in Information Technology and Engineering (ic-ETITE), Feb. 24-25, 2020, which is incorporated herein by reference.

In some embodiments, applying a signal processing algorithm comprises extracting color information from the first digital image and mapping the color information to one or more color histograms to generate the respective signal for each first digital image.

In some embodiments, the one or more color histograms comprise one or more of a Commission Internationale de léclairage L*a*b (LAB) hue-saturation-lightness (HSL), hue-saturation-value (HSV), red-green-blue (RGB), or grey-scale histogram. In some embodiments, the one or more color histograms are two or more color histograms.

In some embodiments, the one or more color histograms comprise two or more of a Commission Internationale de léclairage L*a*b, LAB, hue-saturation-lightness, HSL, hue-saturation-value, HSV, red-green-blue, RGB or greyscale histogram.

In some embodiments, the color histograms are selected based on a discriminative power of each of color histograms.

In some embodiments, the input data is generated using the respective signals for each first digital image when two signal processing algorithms are applied to each first digital image. In some embodiments, the first signal processing algorithm is a filter that models a local noise pattern, as described above, and the second signal processing algorithm extracts color information from the first digital images as described above.

The signal processing algorithms described above are by way of example only and any signal processing algorithm that is capable of isolating useful signals for detecting anomalies may be employed in the training of the machine learning model. In this way, when a new class of document is presented to the machine learning system, the most effective signal processing algorithm may be selected for detecting anomalies in that particular class of documents. An advantage of this approach is that when new fraud mechanisms attack a class of documents, alternative signal processing algorithms may be tested in the manner described in the present disclosure in order to select the most effective algorithm for detecting anomalies resulting from that particular new fraud scheme.

The application of the one or more signal processing algorithms to the first digital images yields respective signals for each first digital image. The discriminative power for a signal processing algorithm is based a distance measure between the signals generated with the respective signal processing algorithm for each first digital image of the at least one digital image of the document of the class of documents not containing an anomaly and the signals generated with the respective signal processing algorithms for each first digital image of the at least one digital image of the document of the class of documents containing an anomaly. For example, the distance measure may be Mahalanobis distance or Euclidian distance.

In some embodiments, the method of training a machine learning model for detecting anomalies in images of documents of a class of documents may further comprise obtaining one or more additional documents of the class of documents containing an anomaly, and obtaining a third digital image for each document of the one or more additional documents, each third digital image being an image of a region of the respective document, wherein the region of the respective document is the same as the region of each document of the first and second sets of digital images of documents. The method may further comprise applying the signal processing algorithms to each of the third digital images to generate a respective signal for each third digital image of the additional documents and each signal processing algorithm. Next, the method evaluates the discriminative power of each signal processing algorithm using the signals for the first digital images and the third digital images generated with the respective signal processing algorithm and selects, based on the discriminative power, one or more additional signal processing algorithms from the plurality of signal processing algorithms. Next, new input data for the machine learning model is generated using one or more respective signals generated by applying the selected one or more of the plurality of signal processing algorithms and the additional selected one or more signal processing algorithms to each of the second digital images, and, optionally, to each of the plurality of third digital images. Finally, the machine learning model is further trained using the new input data to produce output data indicative of whether an image of a document of the class of documents contains anomalies or not.

The machine learning model may be an artificial neural network (ANN)—for example, deep artificial neural network (DNN), such as a convolutional neural network (CNN), a support vector model (SVM), random forest, isolation forest or any other supervised and unsupervised machine learning model.

Depending on the number of images in the plurality of second digital images, the input data for the machine learning model is generated in the following way. If the number of images is below a first threshold, the input data is generated without pixel data for each second digital image. If, on the other hand, the number of images is above the first threshold, the input data may be generated by combining the pixel data with the one or more respective signal(s) generated for that same second digital image. The combination could, for example, be a concatenation of the pixel data of each second digital image with the one or more respective signal(s) generated for the same second digital image.

In some embodiments, the input data is generated in the following way. If the discriminative power of the one or more selected signal processing algorithm(s) is below a second threshold, the pixel data for each second digital image is combined with the one or more respective signals generated for the same second digital image. For example, the pixel data for each second digital image is concatenated with the one or more respective signal(s) generated for the same second digital image. If, on the other hand, the discriminative score is above the second threshold, the input data is generated without the pixel data.

The training of the machine learning model set out above is for at least one region of each document in the second set of digital images of documents. The same steps as above may be repeated to train respective machine learning models for the remaining regions in each document. Optionally, the input data obtained for each region in each document in the second set of digital images of documents may be combined to provide combined input data and the machine learning model is trained using this combined input data to produce output data indicative of whether a digital image of a document of the class of documents contains anomalies or not.

As well as providing a computer implemented method of training a machine learning model for detecting anomalies in digital images of documents, the present disclosure also provides a method for detecting anomalies in an image of a document of a class of documents. The method comprises providing the selected signal processing algorithm(s) and the machine learning model(s) trained in the manner described above, applying the selected signal processing algorithm(s) to digital images of the document to generate input data for the trained machine learning model(s), and using the input data to generate output data that indicates the presence or absence of anomalies. Therefore, at inference time, the chosen signal processing algorithms as determined in the manner described above will be applied to inference data to generate input data for the one or more machine learning models trained in the manner described above (i.e. during the training stage) to generate an output indicative of the presence or absence of anomalies in the inference data.

The trained machine learning model(s) can be a single model that is trained using combined inputs from the plurality of regions of the second digital images or there can be several models, each trained for a respective region of the second digital image.

In some embodiments, where the document whose authenticity is being tested comprises a plurality of regions, the above method for detecting anomalies in images of a document may be repeated for the plurality of regions of the document. In this case, the step of generating input data for the document comprises generating input data—"region input data"—corresponding to each region by applying the one or more machine learning algorithm(s) and then combining the region input data to generate the input data corresponding to the document.

Aspects extend to a computer program product or one or more computer-readable media encoding computer instruction that, when executed on a computing device, implement methods as described above and to a system comprising the one or more computer readable media, a memory and a processor for executing the instructions. Further, aspects extend to a computer system comprising means for implementing the method steps described above and a computer system comprising a memory and a processor configured to carry out the method steps described above.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 5 illustrates an example of color as a signal for detecting anomalies.

FIG. 10A shows an example of a distance of a signal for an image of a document not containing anomalies.

FIG. 10B shows an example of a distance of a signal for an image of a fraudulent document containing anomalies.

DETAILED DESCRIPTION

A major problem with detecting anomalies indicative of fraud in a government issued or otherwise official document is that, as well as known fraud attacks, new fraud attacks are routinely employed in particular document types. Although machine learning is a powerful approach to solving a variety of anomaly detection problems, it faces two major challenges: the first challenge is directing machine learning models to specifically learn the relevant parts of the information from the data and the second challenge is to accomplish this task with limited amounts of data. The solutions offered by existing methods require vast amounts of data and/or time and a group of highly skilled scientists to create individual solutions to each and every fraud scheme. This significantly hampers the extension of these approaches to different fraud mechanisms resulting in different types of anomalies in different types of documents and limits the speed with which anomaly detection solutions can be delivered when a new fraud attack in a particular document or a particular type of documents is detected.

The present disclosure addresses these problems and provides a method for training a machine learning model, which trains the machine learning model to efficiently learn the relevant parts of data works effectively with a limited amount of available data.

Selecting signal processing algorithm(s) that have the highest power of predicting whether or not an image of a document in that particular class of documents contains anomalies, effectively isolates "useful" signals in the image of that document—useful in indicating whether the image of the document contains anomalies or not—which, when fed to a machine learning model, allows the machine learning model to learn the relevant parts of the information from the data. That is, by selecting the most appropriate signal processing algorithm, the method directs the machine learning model to specifically learn the relevant parts of the information from the data, which in turn, boosts the learning efficiency of the machine learning model.

Figure 1A:
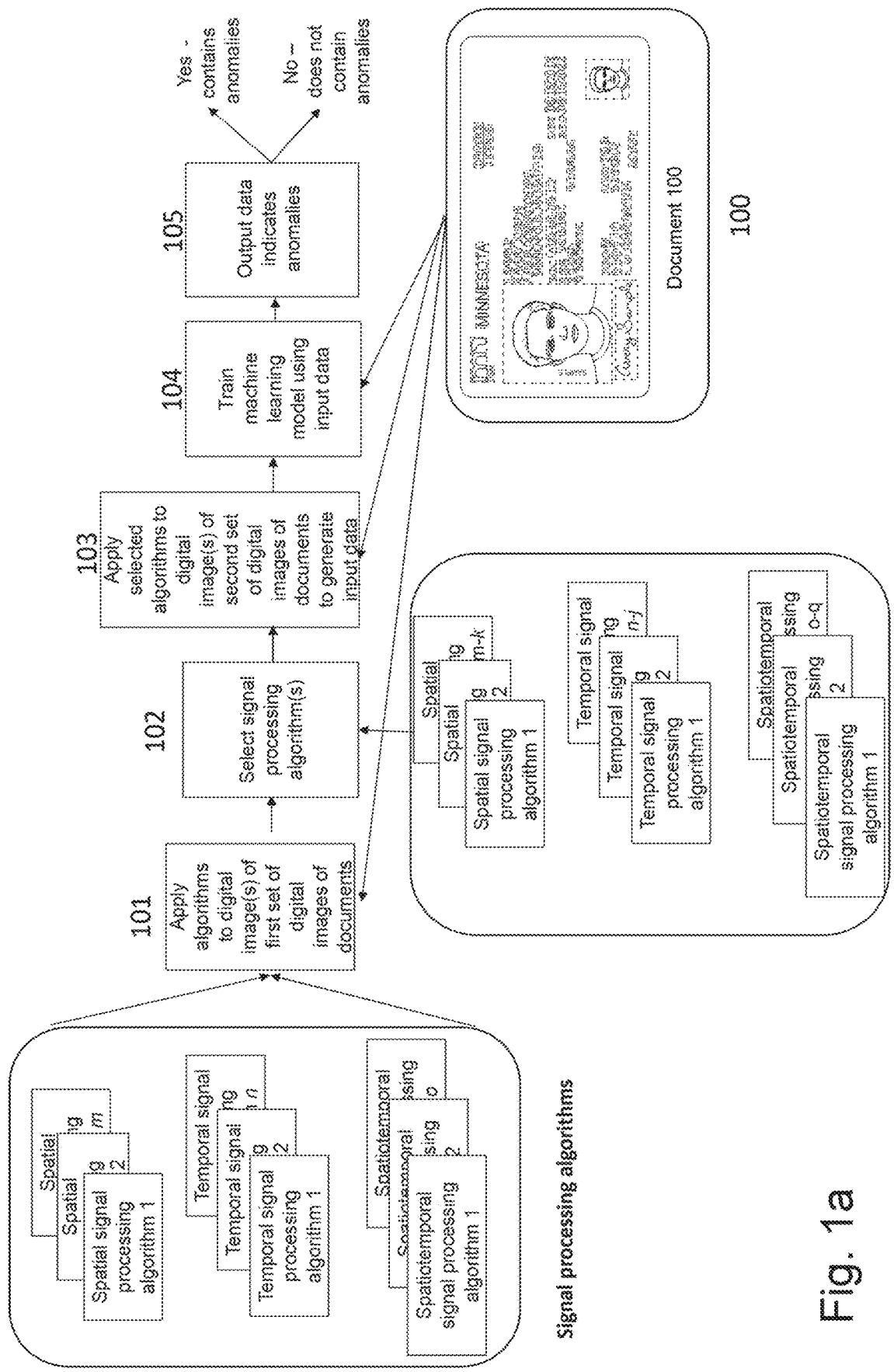
FIGS. 1A and 1B illustrate an overview of training and using a machine learning model for detecting anomalies in a digital image of a document.
Figure 1B:
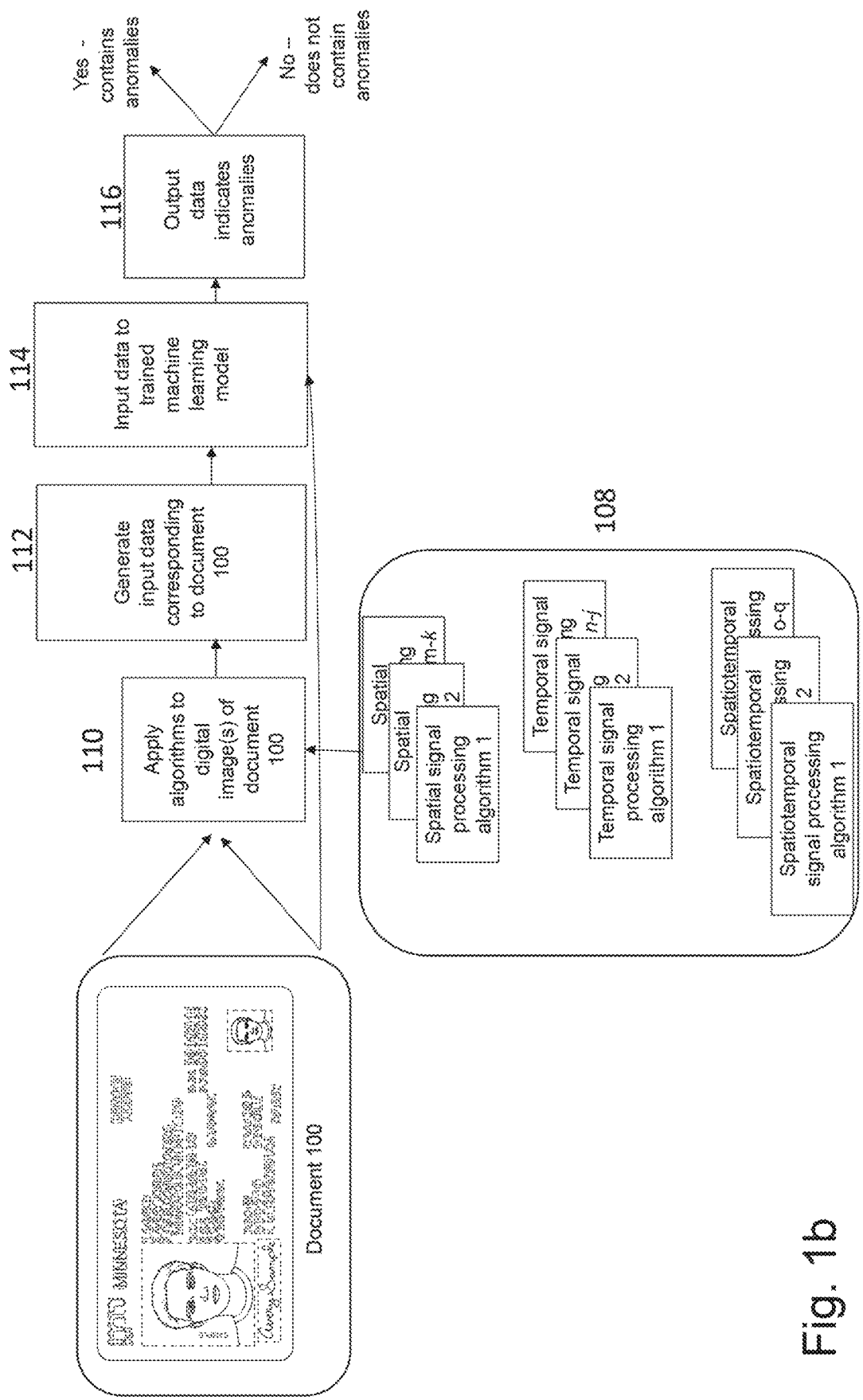

FIGS. 1A and 1B schematically depict a high-level overview of methods of training and using a machine learning model for detecting anomalies in images of documents in a class of documents. It is noted that certain structural features have been placed in boxes with round corners to distinguish them from the method steps. The documents may be government issued documents or otherwise official documents. An official document 100 may take one of many forms such as a driver's license, a passport, a utility or other bill, a birth certificate, a benefits book, a state identity card, or a residency permit. The term "official document" is therefore intended to cover any document that contains structured information that may be used to verify a person's identity or an aspect relating to a person, for example their address. The different forms of official document 100 may be referred to herein as being a particular "class" of document 100, which may be further restricted by the territory of issue. For example, an official document class might be a 'UK passport', a 'Finnish driving license', etc.

With reference to FIG. 1A, training a machine learning model to detect anomalies in images of documents in a class of documents comprises three main stages: applying a number (more than two) of signal processing algorithms to a first set of digital images of documents 101 in order to select suitable signal processing algorithm(s) 102, applying the selected signal processing algorithm(s) to a second set of digital images of documents in the class of documents to generate input data for the machine learning model 103, and training the machine learning model using the input data 104 to produce output data indicative of whether a digital image of a document in a class of documents contains an anomaly or not.

With reference to FIG. 1B, using a machine learning model to detect anomalies in an image of a document 100 of a class of documents comprises: applying 110 the selected signal processing algorithm(s) 108 to the digital image of the document 100 to generate input data for the trained machine learning model 112, using the input data as input to the trained machine learning model 114, where the trained machine learning model outputs data 116 indicative of the digital image of the document 100 containing anomalies or not.

Examples of Signal Processing Algorithms

With reference to FIG. 1A at step 101, signal processing algorithms are applied to digital images of a first set of digital images of documents. These digital images, denoted first digital images, are images of a first set of digital images of documents in the class of documents to which document 100 belongs. For example, if the document 100 is a UK passport, digital images of a set of UK passports are obtained. These first digital images are images of a region of the documents in the first set of digital images of documents. Furthermore, the first set of digital images of documents includes at least one digital image of a document not containing an anomaly and at least one digital image of a document containing an anomaly.

With reference to FIGS. 2-6, examples of signal processing algorithms that may be applied to the digital images are now described. Signal processing algorithms may comprise spatial signal processing algorithms, temporal signal processing algorithms and spatio-temporal signal processing algorithms.

Figure 2A:
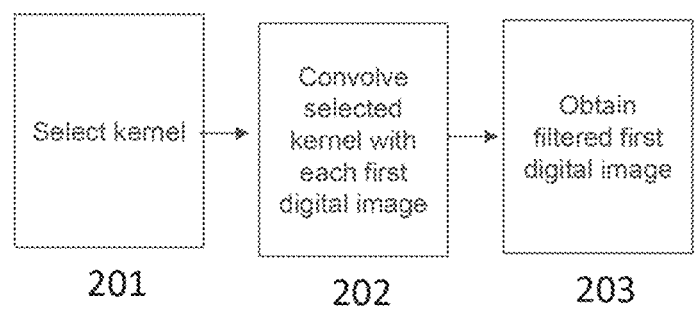
FIG. 2A illustrates an example of applying a signal processing algorithm using a filter.

With reference to FIG. 2A, applying a spatial signal processing algorithm that filters local noise patterns comprises convolving a kernel with each first digital image to obtain the respective filtered first digital. Optionally, where a pre-defined filter (kernel) for a particular local noise is not available, at step 201, a kernel may be selected from a number of (more than two) kernels (201), e.g., steganography kernels. At step 202, the selected or pre-defiled kernel is convolved with each first digital image to obtain respective filtered first digital images (203).

The kernels may, for example, be selected from among some thirty different kernels which are outlined in J. Fridrich and J. Kodovsky, "Rich Models for Steganalysis of Digital Images," IEEE Transactions on Information Forensics and Security, published Jun. 1, 2012, which is incorporated herein by reference. Any number of unsupervised anomaly detection algorithms such as selective unsupervised convolutional neural networks (S-CNN) or clustering algorithms may be used to determine which kernel(s) is/are best suited for a given problem. Other approaches for determining the suitable kernel(s) may be found in (i) P. Zhou et al., "Learning Rich Features for Image Manipulation Detection," arXiv:1805.04953 [cs.CV], 13 May 2018 and (ii) M. Alloghani et al., "A Systematic Review on Supervised and Unsupervised Machine Learning Algorithms for Data Science," Unsupervised and Semi-Supervised Learning, DOI: 10.1007/978-3-030-22475-2_1, published 2019, each of which are incorporated herein by reference. Kernels may alternatively or additionally be selected based on trial and error and/or experience by an operator. Three example kernels (a), (b) and (c), which were used in a particular example of the present disclosure, are defined as follows:

$$\frac{1}{4}\begin{bmatrix} 0 & 0 & 0 & 0 & 0 \\ 0 & -1 & 2 & -1 & 0 \\ 0 & 2 & -4 & 2 & 0 \\ 0 & -1 & 2 & -1 & 0 \\ 0 & 0 & 0 & 0 & 0 \end{bmatrix} \quad (a)$$

$$\frac{1}{12}\begin{bmatrix} -1 & 2 & -2 & 2 & -1 \\ 2 & -6 & 8 & -6 & 2 \\ -2 & 8 & -12 & 8 & -2 \\ 2 & -6 & 8 & -6 & 2 \\ -1 & 2 & -2 & 2 & -1 \end{bmatrix} \quad (b)$$

$$\frac{1}{2}\begin{bmatrix} 0 & 0 & 0 & 0 & 0 \\ 0 & 0 & 0 & 0 & 0 \\ 0 & 1 & -2 & 1 & 0 \\ 0 & 0 & 0 & 0 & 0 \\ 0 & 0 & 0 & 0 & 0 \end{bmatrix} \quad (c)$$

These example kernels are provided by way of example only and the choice of kernels is by no means limited to these examples. The process of acquiring a digital image of a document introduces varying levels of noise at pixel level in the digital image. Image noise refers to a random variation of brightness or color information in images and is a by-product of image acquisition. Different noise patterns arise, for example, from motion blur, focus variations, sampling variations, sensor differences or lighting differences between different image acquisitions. Noise patterns vary in complexity and the relevant kernels may be selected depending on how complex the noise pattern is expected to be. At pixel-level, noise complexity refers to the variation in a pixel's neighborhood and can range from simple in neighborhoods with uniform pixels to more complex in neighborhoods with non-uniform gradients. For example, for a particular first digital image, local noise may be present in all the image pixels, in which case a kernel such as kernel (b) may be selected. On the other hand, kernel (c) provides filtering in the x-direction only and may be used when noise arises in the x-direction of a digital image.

Figure 2B:
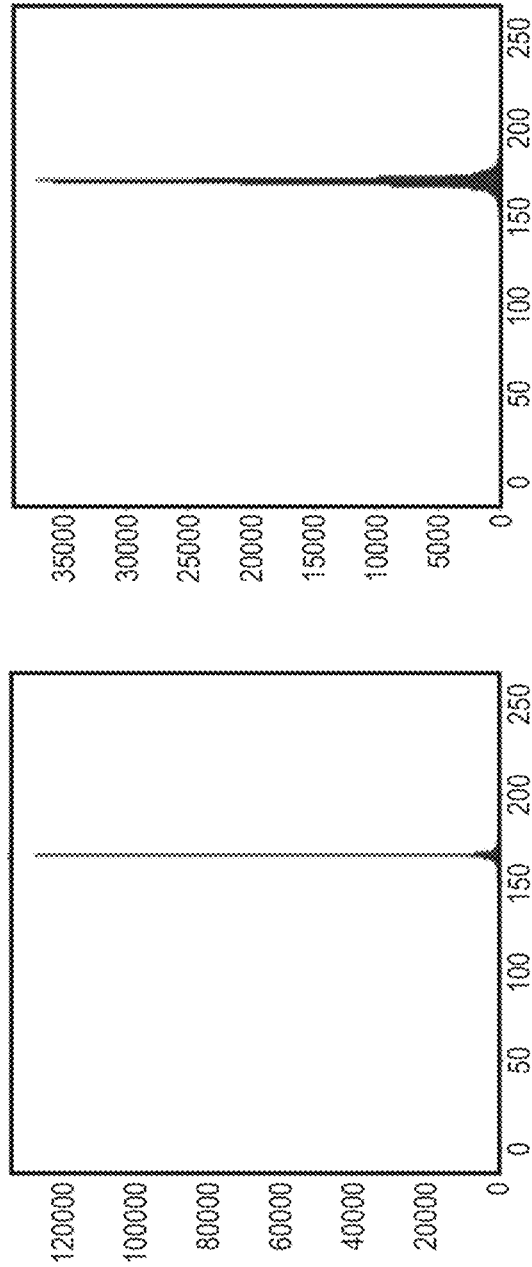
FIG. 2B compares examples of histograms of filter outputs for a digital image of a document containing an anomaly and a digital image of a document not containing an anomaly.

With reference to FIG. 2B, an example comparison of the histograms of noise values for an image of a document containing an anomaly and an image of a document not containing an anomaly is presented. The vertical axes on the images depict the number of pixels and the horizontal axes show the pixel values of the image. As can be seen from this comparison, there is a large shift in the histogram of the image of the document containing an anomaly compared to the image of the document not containing an anomaly. The figure also shows that example kernel (a) above, which was applied to these images, is ideal for detecting noise that arises from fraud (rather than noise sources present at the image acquisition process). Although simple metrics such as mean and standard deviation may be used to determine which kernels would work best for particular images and noise sources, more complex unsupervised methods would be a preferred option for determining the suitability of a kernel.

Figure 3:
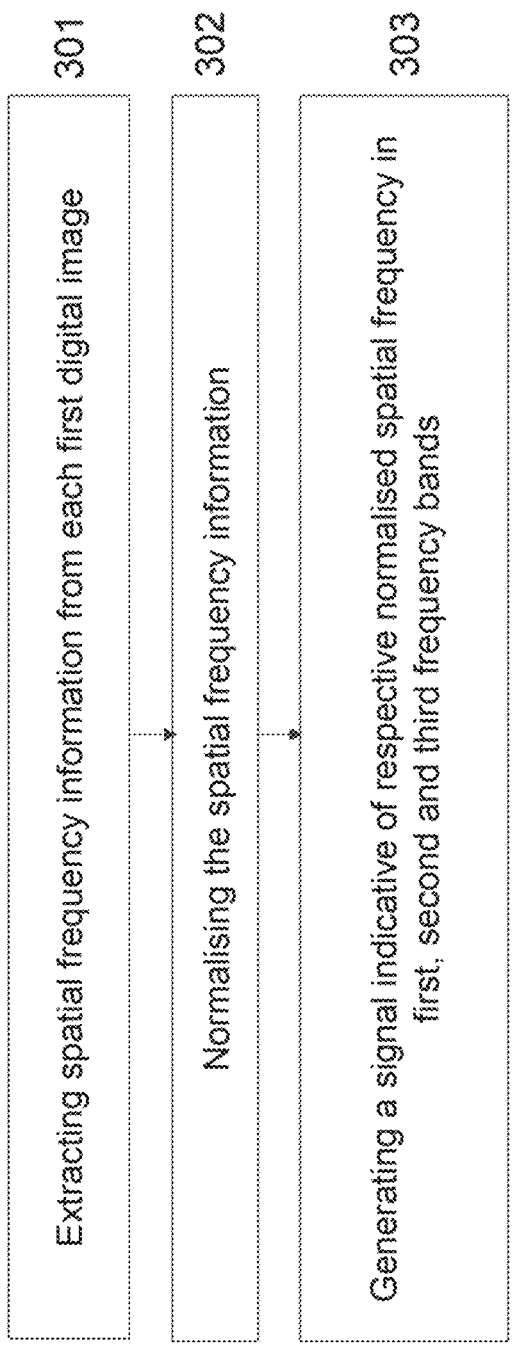
FIG. 3 illustrates a flowchart for applying signal processing algorithms using frequency analysis.

With reference to FIG. 3, another signal processing algorithm that may be applied to the first digital images, is presented. This spatial signal processing algorithm takes advantage of spatial frequency information. Frequency information can be complex and rich and while machine learning models can learn frequency information, they tend to require vast amounts of data with all its variations to be able to learn the relevant frequency signals efficiently.

One way of using the spatial frequency information in an image is to break the frequency space into different frequency bands. For example, the frequency space can be partitioned into low, medium, and high frequency bands. At step 301, spatial frequency information is extracted for each first digital image using, for example, Fourier or a wavelet transform analysis. At step 302, the extracted frequency information is normalized to a scale between 0 and 1, where 0 represents zero frequency and 1 represents the highest frequency with a threshold power or amplitude. The normalized spatial frequency information is then divided into first, second and third normalized spatial frequency bands. The first spatial frequency band is below a first normalized spatial frequency, the second spatial frequency band is above the first spatial frequency but below a second spatial frequency, and the third spatial frequency band is below the second spatial frequency but below a third spatial frequency. More generally, there may be any number of frequency bands. The spatial frequency information may be indicative of the power within each band. For example, the spatial frequency information may be the power or magnitude of the coefficients of the frequency analysis, for example, Fourier or wavelet analysis.

At step 303, the signal that is generated from the extracted spatial frequency information is indicative of the respective normalized frequency information in each of the first, second and third frequency bands. An example of the use of spatial frequency information in the present disclosure is looking at a scenario where a fraudster is using a picture of a screen instead of a picture of a document. Taking a picture of a screen leaves an overlay of Moiré pattern on top of the image data. A Moiré pattern is an interference pattern that is produced when an opaque ruled pattern with ruled transparent gaps is overlaid on another similar pattern. Different manifestations of the Moiré pattern show signals in different spatial frequency bands, which makes the signal processing algorithm using spatial frequency information, as set out in the present disclosure, suitable for isolating discriminative frequency space signals which can later be fed to the machine learning model for a data efficient learning process. For example, a first type of Moiré patterns may have high frequency and may be visible only in the Y plane of the YCbCr color model, which is equivalent to the Grayscale image derived from the RGB color model. A second and third type of Moiré patterns may be almost invisible in the Y plane (i.e. have very low contrast in the Greyscale image), but can cause significant color changes of the background color and have lower spatial frequency than Moiré patterns of the first type. To detect the second and third type of these patterns, a full decoding of the images and conversion to other color models may be necessary.

Figure 4A:
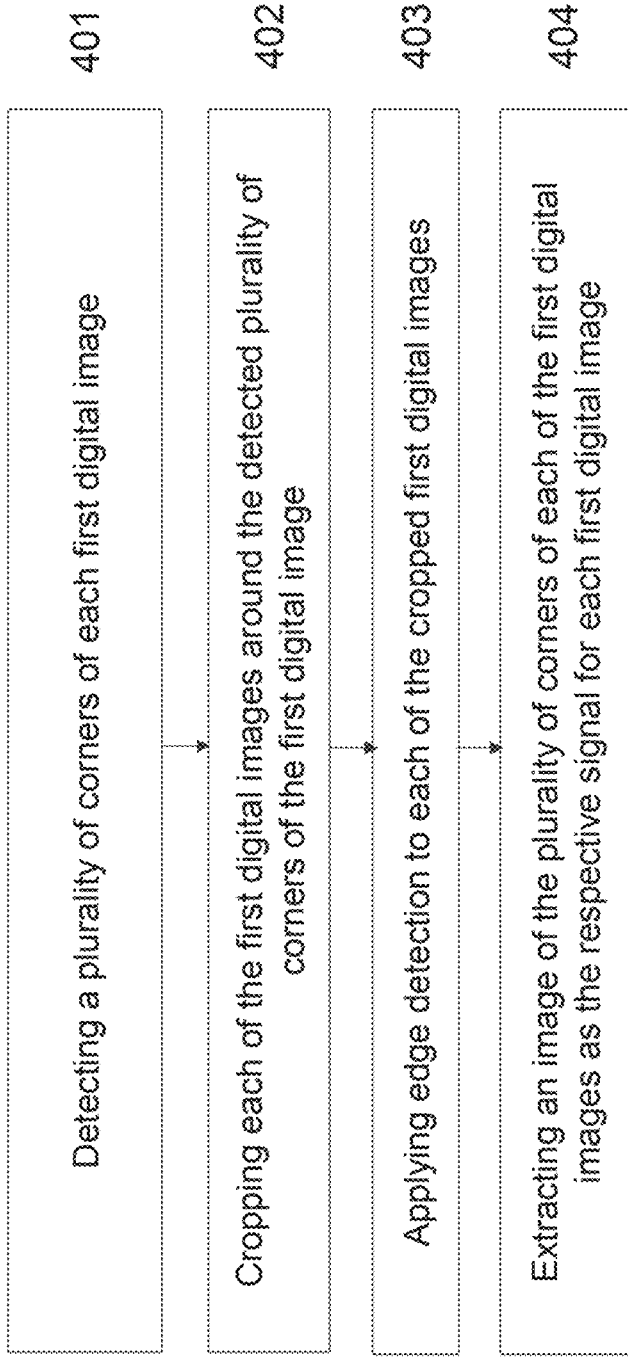
FIG. 4A illustrates a flowchart of applying signal processing algorithms using edge detection.

With reference to FIG. 4A, yet another example of a signal processing algorithm is presented. This signal processing algorithm—edge detection—is particularly useful when a fraudster presents a printed copy of a document in place of the original. In this scenario, the fraudster is often unable to cut the edges of the printed copy in exactly the same way as the edges of the original document are cut, which results in an anomalous document. In such cases, the use of edge detection in the manner described in the present disclosure provides an additional tool for detecting anomalies in images of documents.

Figure 4B:
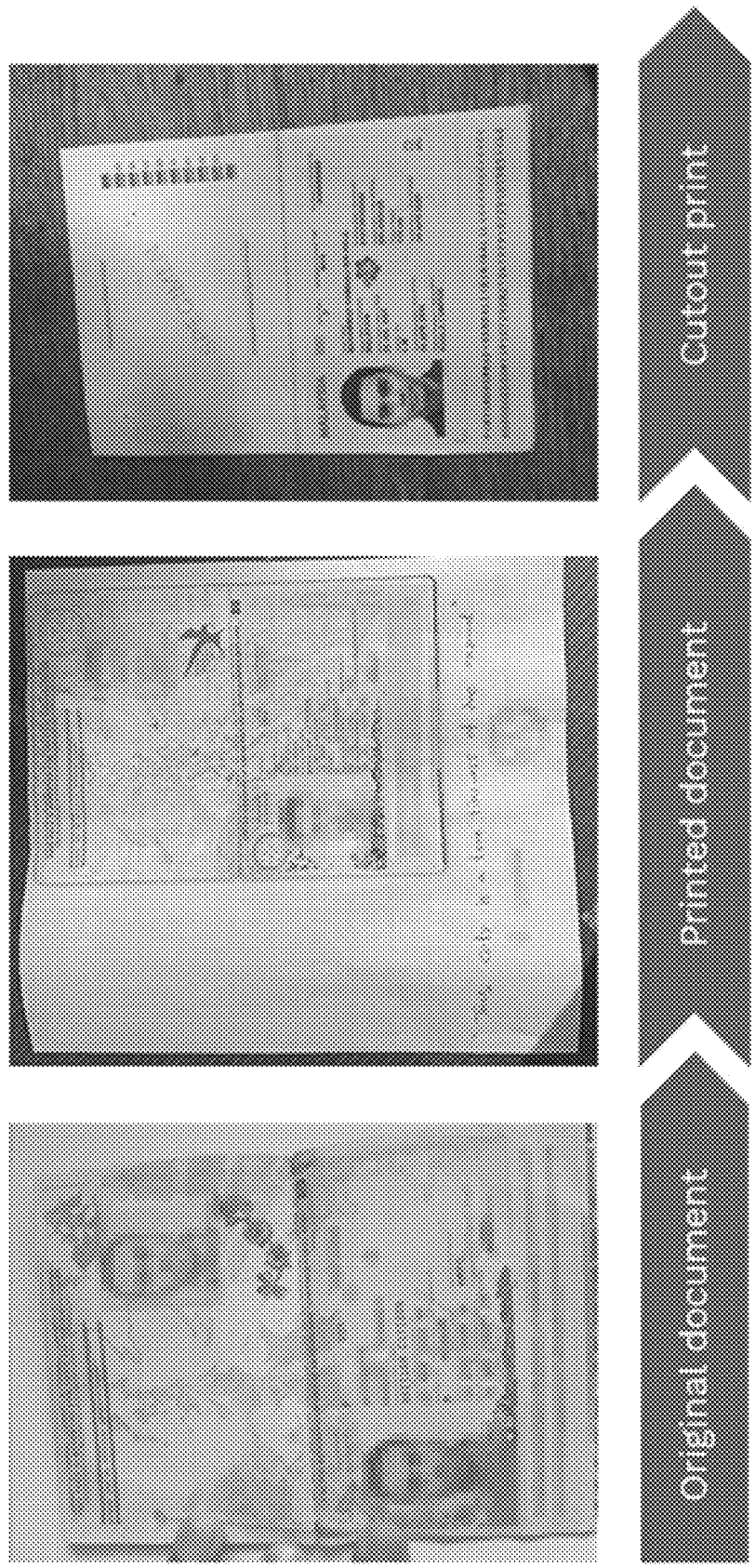
FIG. 4B depicts a comparison of an original document with its corresponding cut-out print.
Figure 4C:
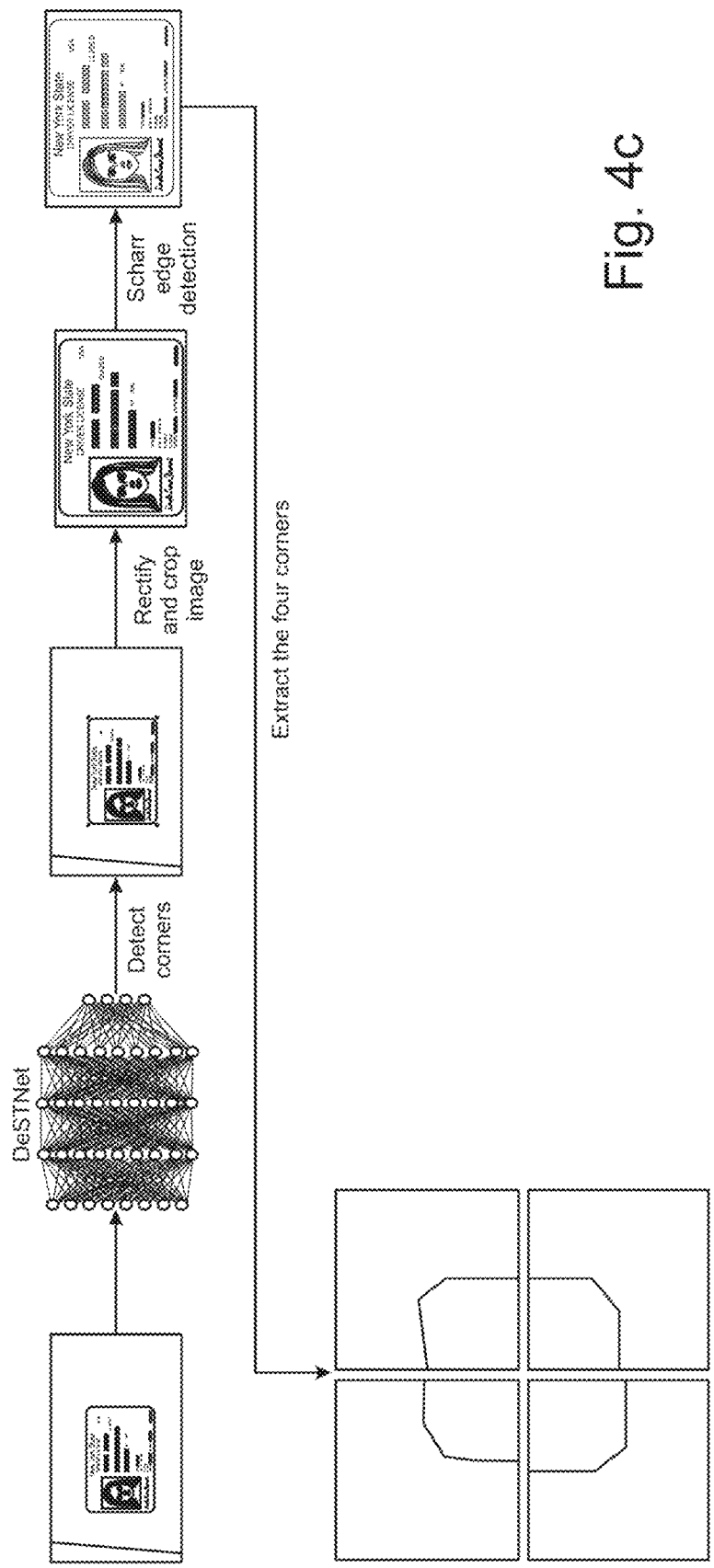
FIG. 4C illustrates an example of applying edge detection to an image of a document.

With reference to FIG. 4B, an example of an original document and a cut-out of a printed copy of that document is shown. With reference to FIG. 4C, an example of edge detection is presented.

With reference to FIGS. 4A and 4C, one or more edges of each first digital image are extracted as the respective signal for each first digital image. At step 401, a plurality of corners of each first digital image is detected. For example, each of the first digital images is fed to a convolutional neural network (CNN) to detect a plurality of corners of the respective first digital image. Convolutional neural networks are a class of deep neural networks that are used in analyzing visual imagery. A non-limiting example of a CNN that was used in the present disclosure is Densely Fused Spatial Transformer Networks (DeSTNet) as described in R. Annunziata et al., "DeSTNet: Densely Fused Spatial Transformer Networks," arXiv:1807.04050 [cs.CV], 11 Jul. 2018, which is incorporated herein by reference. DeSTNet is a type of neural network especially designed to reduce the effects of intra-class variability caused by spatial transformations in the input data that may occur when acquiring digital images of documents and thus improve the CNN's performance. This is of course, just one example of performing edge detection and there are a number of other ways, including using edge detection filters such as the Sobel filter or Canny edge detectors.

At step 402, each first digital image is cropped around the detected corners of the first digital image to obtain cropped first digital images. At step 403, edge detection is applied to the cropped first digital images. A non-limiting example of an edge detection filter that was used in the present disclosure is Scharr edge detection as described in S. Sharma and V. Mahajan, "Study and Analysis of Edge Detection Techniques in Digital Images," International Journal of Scientific Research in Science, Engineering and Technology (IJSRSET), Vol. 3, Issue 5, August 2017, which is incorporated herein by reference. At step 404, images of the plurality of corners of each first digital image are extracted as the respective signals for each first digital image, each signal being represented as a bitmap.

Another rich source of information in documents is color. With reference to FIG. 5, a visual comparison between colors of example documents containing an anomaly and without an anomaly is depicted. It is clear from these examples that color can provide highly discriminative information for detecting fraud in documents.

Figure 6:
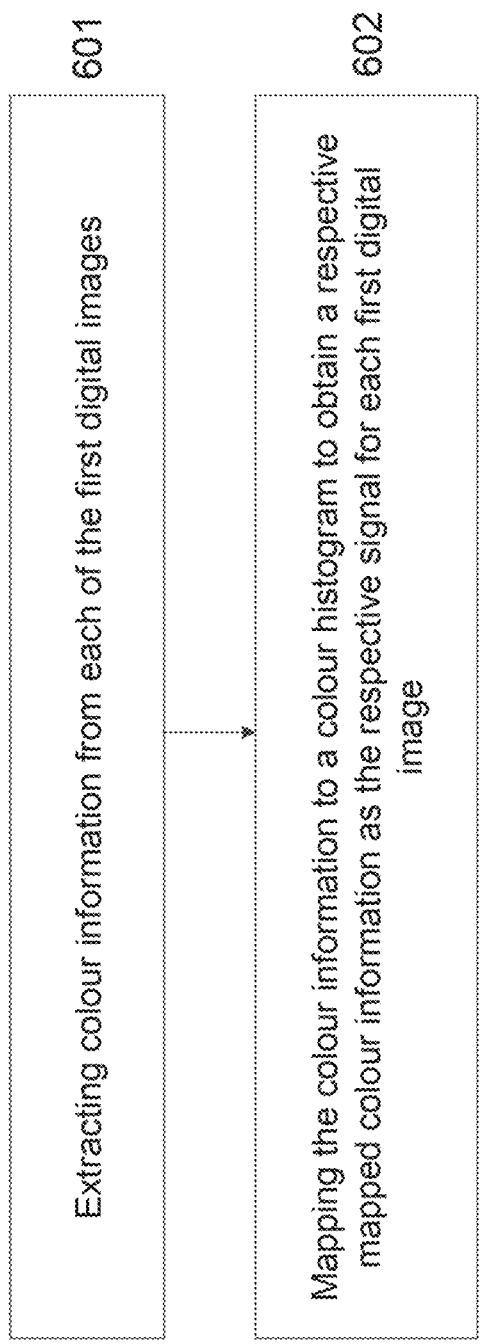
FIG. 6 illustrates a flowchart for applying signal processing 10 algorithms using color detection.

With reference to FIG. 6, an example is presented of a signal processing algorithm which uses color information in documents. At step 601, color information is extracted from each first digital image. By way of a non-limiting example, color information may be extracted by transforming the colors in each first digital image to a different color space such as Commission Internationale de léclairage L*a*b (LAB), described at en.wikipedia.org/wiki/CIELAB_color_space. At step 602, the extracted color information is mapped to one or more color histograms, each histogram representing a different color space, to generate the respective signal for each first digital image. The color histograms can be built from the colors of a digital image represented in one or more color spaces such as LAB, hue-saturation-lightness (HSL), hue-saturation-value (HSV) (described at en.wikipedia.org/wiki/HSL_and_HSV), red-green-blue (RGB), or greyscale.

Optionally, the one or more color histograms comprise two or more of a Commission Internationale de léclairage L*a*b, LAB, hue-saturation-lightness, HSL, hue-saturation-value, HSV, red-green-blue, RGB or greyscale color space histograms.

Optionally, the color histograms are selected based on a discriminative power of each of the color histograms.

Preferably, the color histograms are selected based on the discriminative power of each color histogram. In this case, the discriminative power of a color histogram refers to the ease with which outliers can be detected in the color histogram. For example, some outliers cannot be easily detected in the RGB color space, however, might become easily separable in the HSL or LAB color space. Therefore, in this example, the discriminative power of the HSL or LAB color histogram is higher than the discriminative power of the RGB color histogram.

The examples of signal processing algorithms described in FIGS. 2-6 are described by way of example only and any signal processing algorithm that is capable of isolating useful signals for detecting anomalies in images of documents may be employed in the training of the machine learning model.

It will be appreciated that the application of signal processing algorithms to the second digital images, which are used for training the machine learning model, is done in the same manner as is described for the first digital images, which are used for selecting signal processing algorithms. It will also be appreciated that the first and second set of digital images of documents—images of regions of which are the first and second digital images, respectively—may be different sets of digital images of documents, may be overlapping sets of digital images of documents, may be the same digital images of documents, or the first set can be a subset of the second set.

Figure 7:
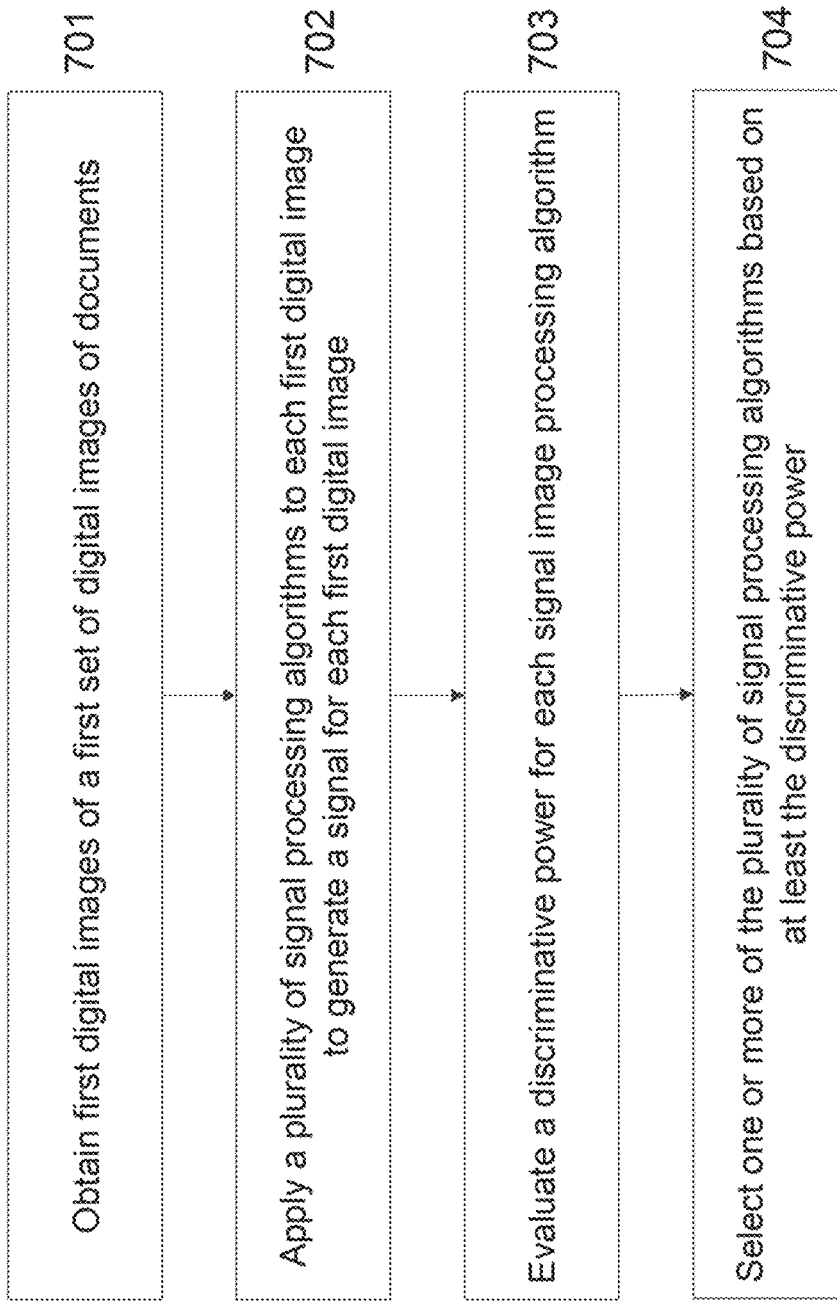
FIG. 7 illustrates a flowchart for selecting signal processing algorithm(s).

With reference to FIG. 7, a flowchart is presented to illustrate how signal processing algorithm(s) may be selected. The application of signal processing algorithms to the first images of the first set of digital images of documents yields respective signals for each first digital image (steps 701-702). In the present disclosure, these signals are used to select the signal processing algorithm(s) based on their discriminative power, wherein the discriminative power is indicative of the power of the signals generated with the signal processing algorithms to discriminate digital images of documents containing an anomaly from digital images of documents not containing an anomaly. At step 703, the discriminative power of the signal processing algorithms is evaluated based on a distance measure between the signals generated with the signal processing algorithms for each first digital image of the documents in the first set of digital images of documents that do not contain an anomaly and the signals generated with the signal processing algorithms for each first digital image of the documents in the first set of digital images of documents that contain an anomaly. At step 704, one or more of the signal processing algorithms are selected based on at least their discriminative power. For example, the signal processing algorithm or algorithms with the most discriminative power are selected. Other factors that may be taken into account when selecting the signal processing algorithms are prior information from similar data distributions of a different class of documents or the first digital images of the document.

Figure 8:
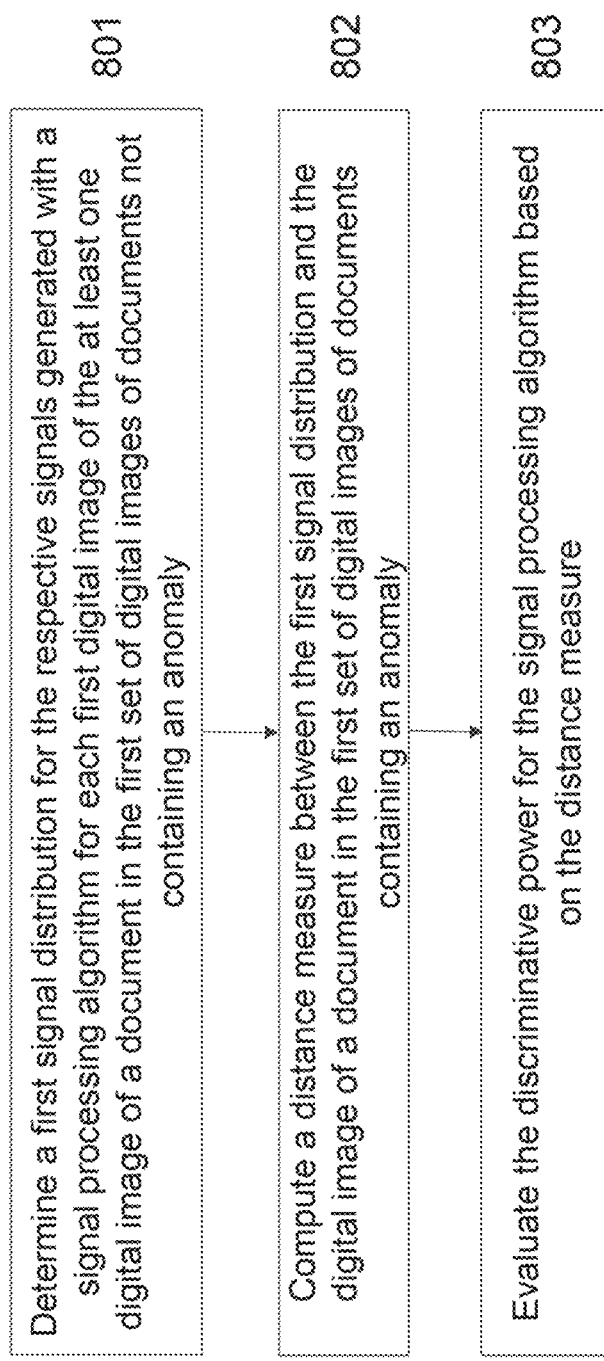
FIG. 8 illustrates a flowchart for evaluating a discriminative power for each signal processing algorithm.

With reference to FIG. 8, a schematic illustration shows an example of how the discriminative power for a given signal processing algorithm S is evaluated given a first set of digital images of documents which contains N number of digital images of documents without anomalies and a single digital image of a document containing an anomaly.

At step 801, the distribution of signals—the first signal distribution—that are obtained from the application of signal processing algorithm S to each first digital image of documents in the first set of digital images of documents that do not contain an anomaly is determined.

Figure 9:
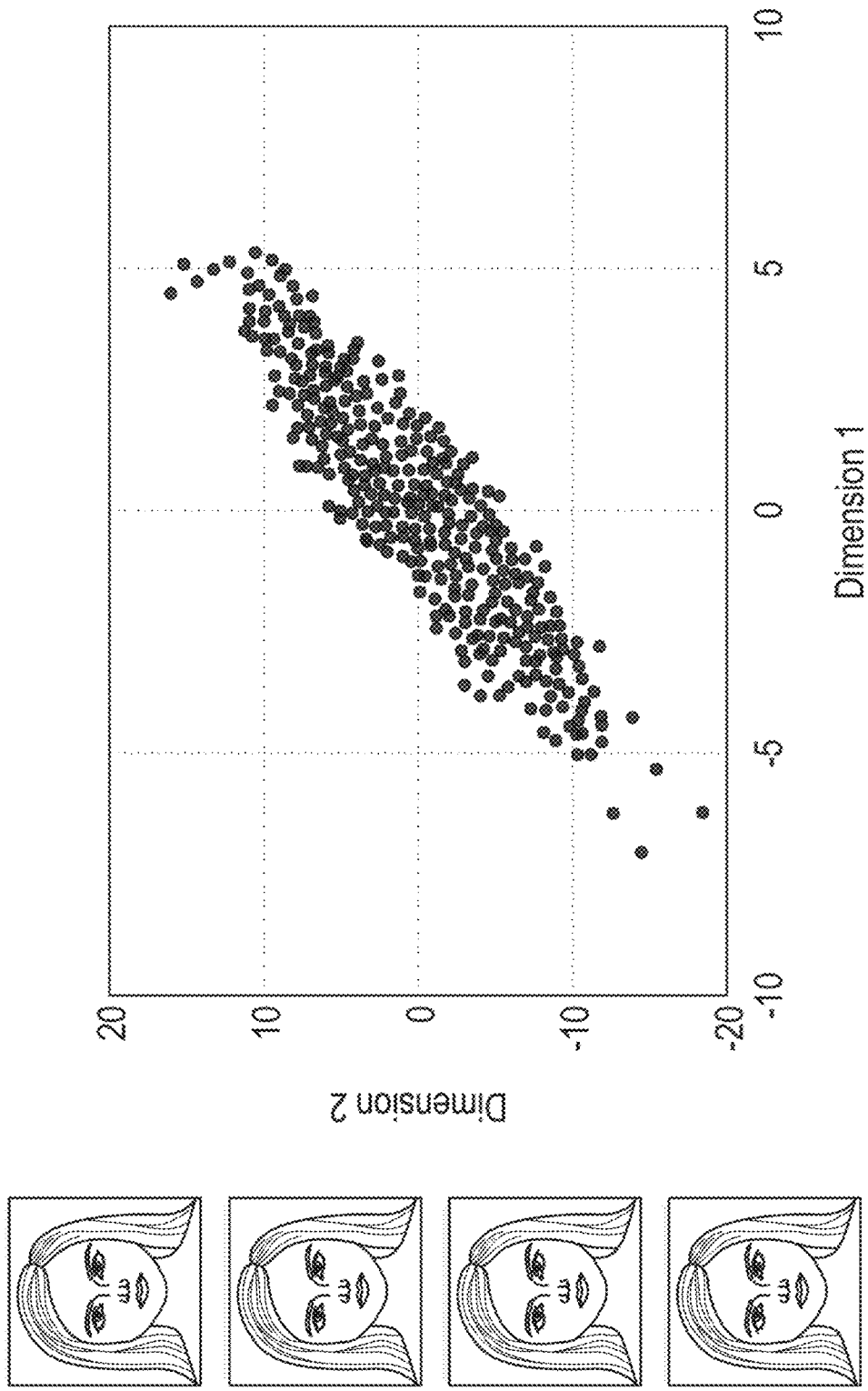
FIG. 9 shows an example of a signal distribution for images of a document.

For every signal processing algorithm, the process starts by calculating the mean and covariance of the first signal distribution (of signals obtained for the first digital image of documents not containing an anomaly by applying a signal processing algorithm). Recalling that every first digital image is an image of a region of a document in the first set of digital images of documents, this means that the process calculates the mean and covariance of the first signal distribution for digital images of the respective region in each of the N digital images of documents in the first set of digital images of documents that do not contain an anomaly. Mathematically, this may be expressed as:

$$S_{NA} = \begin{bmatrix} S_{11} & \cdots & S_{1D} \\ \vdots & \ddots & \vdots \\ S_{N1} & \cdots & S_{ND} \end{bmatrix}$$

where N is the number of digital images of documents in the first set of digital images of documents that do not contain an anomaly and D is the dimensionality of the signals generated with signal processing algorithm S. An example of this representation is shown in FIG. 9, which shows an example of a signal distribution for a signal processing algorithm with dimensionality two (i.e. the signals generated by applying the signal processing algorithm to the first digital images is two).

Given the $S_{NA}$ matrix, the mean, $\vec{\mu}$, of the first signal distribution may be expressed as:

$$\vec{\mu} = (\mu_1, \mu_2, \ldots, \mu_D)^T$$

where $\mu_N$ represents the mean value for the Nth dimension of the signal generated with signal processing algorithm S. Next, the covariance matrix K, which will be a square matrix of dimensionality D, is computed.

At step 802, a distance between the signal vector $\vec{x} = (x_1, x_2, \ldots, x_N)^T$, generated by applying the signal processing algorithm S to the first digital image of the document in the set of digital images of documents that contains an anomaly, and the first signal distribution computed at step 801. The distance measure may be computed using the Mahalanobis distance, is calculated as follows:

$$D_M(\vec{x}) = \sqrt{(\vec{x} - \vec{\mu})^T K^{-1} (\vec{x} - \vec{\mu})}$$

FIG. 10A shows an example of a distance of a signal for a digital image of a document not containing an anomaly. FIG. 10B shows an example of a distance of a signal for a digital image of a document containing an anomaly. The two ovals in the first signal distribution indicate threshold boundaries. The threshold boundaries may, for example, represent percentiles of the first signal distribution. In the particular example of FIG. 10A, the signal for the example digital image of a document that does not contain an anomaly is well within the first threshold boundary. In FIG. 10B, on the other hand, the signal for the example digital image of a document containing an anomaly is outside the second threshold boundary, indicating that the signal processing algorithm is able to discriminate between images of documents containing an anomaly and images of documents not containing an anomaly.

In this way, outliers—those signals falling outside the defined threshold boundaries—are detected, and the more sensitive an signal processing algorithm is to detecting outliers, the higher its discriminative power. Alternatively, several other methods other than the Mahalanobis distance can also be employed to evaluate the discriminative power of signal processing algorithms, including Kullback-Leibler distance, classical machine learning algorithms (e.g., support vector machine, random forests), deep learning models or other clustering algorithms (such as those described in (i) L. Breiman, "Random Forests," *Machine Learning* 45.1, 5-32 (2001); (ii) I. Goodfellow et al., *Deep Learning*, Vol. 1. No. 2. Cambridge: MIT Press (2016); and (iii) C. M. Bishop, *Pattern Recognition and Machine Learning*, Springer (2006); each of which is incorporated herein by reference). In this way, a distance measure between the signals generated with a signal processing algorithm from digital images of documents not containing an anomaly and the signals generated with the signal processing algorithms from digital images of documents containing an anomaly are computed using any of the methods above, and the larger the distance measure between the signals, the higher the discriminative power of the respective signal processing algorithm.

At step 803, the discriminative power of the signal processing algorithm is then evaluated based on the distance measure. It should be noted that the evaluation of the discriminative power of a signal processing algorithm using the Mahalanobis distance is described by way of example only and other of the methods mentioned in the previous paragraph may also be utilized for evaluating the discriminative power.

Steps 801-803 are repeated for each signal processing algorithm in the plurality of signal processing algorithms so that a discriminative power is obtained for each signal processing algorithm with respect to a respective region. If signal processing algorithms are selected for more than one region of interest, then steps 801-803 are repeated for each signal processing algorithm and each region of interest, as illustrated in FIGS. 11 and 12 below.

Figure 11:
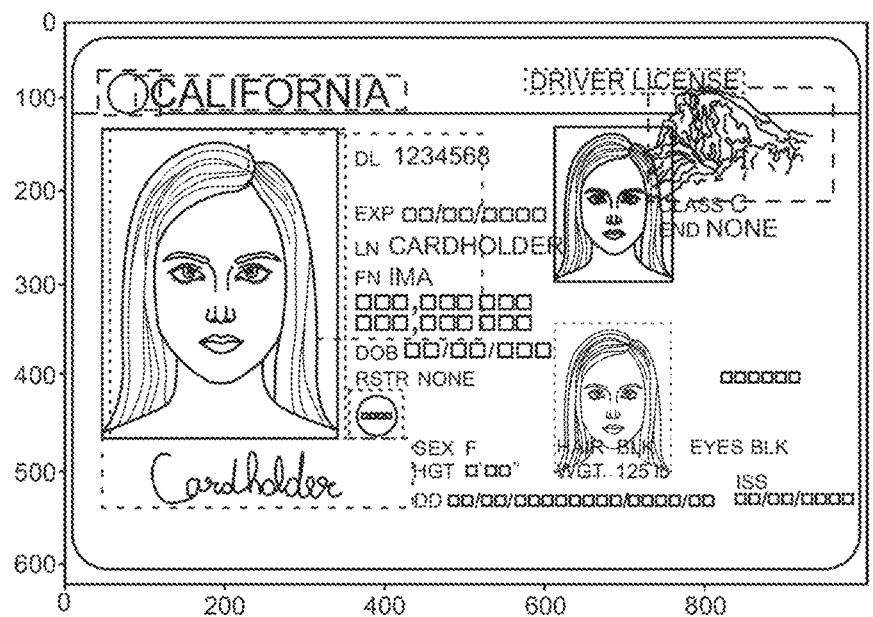
FIG. 11 shows an example of an example of a class of documents.
Figure 12:
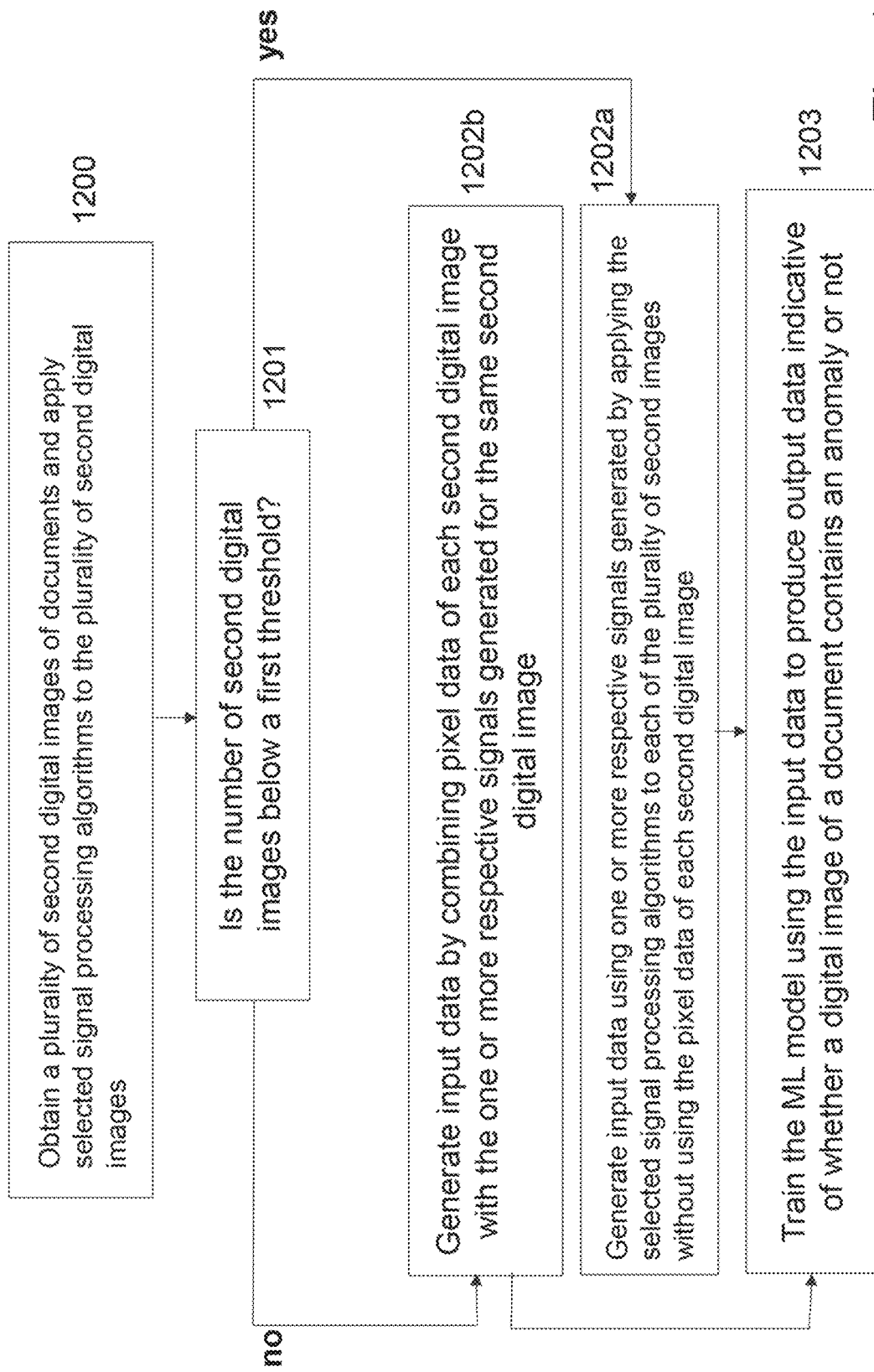
FIG. 12 illustrates a flowchart for generating input data for a machine learning model and training the machine learning model.

FIG. 11 shows an example of a California driver's license. In this example, the image of the document is split into nine regions, including a signature region, a document type region, a name region, etc. As explained above, the Mahalanobis distance is calculated for each signal processing algorithm and for each of the region of interest of the driver's license, marked by a rectangular shape in the example document in FIG. 11.

While some algorithms have a high discriminative power for certain regions of the document, they may have a low prediction score for some other regions. For example, while signal processing algorithms involving color may have a high discriminative power for images of the signature strip, the same algorithms may have a lower discriminative power for images of the hologram section of the document.

It is clear that selecting specific signal processing algorithm(s) with the highest discriminative power for each region of a document and training the machine learning model using the selected algorithms ensures that the trained machine learning model is capable of detecting anomalies with high accuracy. In this way, accurate anomaly detection may be obtained even when only a handful of documents in a class of documents are available. The accuracy of anomaly detection is enhanced by using different signal processing algorithm(s) for different regions of the digital image such that signal processing algorithm(s) that is/are best suited to a particular region in terms of their discriminative power— for example, as measured by the distance percentile—are used for the respective region.

Furthermore, depending on the discriminative power obtained for each region of the first digital image, it is possible to isolate the "informative regions", i.e., those for which at least one signal processing algorithm has a discriminative power above a particular threshold, and only use the signals generated from these regions as input data for training the machine learning model. The selection of signal processing algorithms based on their discriminative power may be done using unsupervised machine learning, which is a class of machine learning algorithms that learn from unlabeled data.

Referring back to FIG. 1, after the signal processing algorithm(s) is/are selected (step 102), the next step in the training of a machine learning model is providing input data for the machine learning model. At step 103 the input data is generated by applying the selected signal processing algorithm(s) to images—denoted second digital images—of a second set of digital images of documents which are within the same class of documents as the documents in the first set of digital images of documents. For example, if the class of documents is UK passports, then both the first and second set of digital images of documents are images of UK passports. The second set of digital images of documents may be the same as the first set of digital images of documents or it may be a different set from the first set. For example, the first set of digital images of documents can be a subset of the second set of digital images of documents. In essence, the first set of digital images of documents is used for selecting suitable signal processing algorithms and the second set of digital images of documents is used for providing input data to the machine learning model. The second set of digital images documents comprise at least one digital image of a document not containing an anomaly and one digital image of a document containing an anomaly.

With reference to FIG. 12, a process for generating input data for the machine learning model is presented. The process begins at step 1200 where a plurality of second digital images of documents is obtained. In a similar manner to the first digital images, each second digital image of a document in the second set of digital images of documents is a region of that document. The selected signal processing algorithms are then applied to second digital images in the manner that was described in relation to the application of signal processing algorithms to the first digital images in FIGS. 2-6.

Depending on the number of training data, i.e., the number of second digital images that are available, the process may choose to generate the input data using the pixel data for each second digital image. Therefore, at step 1201, the process checks to see if the number of second digital images is below a first threshold, say 100 images. If the number of second digital images is below this first threshold, then the input data for the machine learning model is generated by applying the selected signal processing algorithms to the second digital images without using the pixel data for each second digital image (step 1202*a*).

If the number of second digital images is above this first threshold, then the process proceeds to step 1202*b*, where the input data is generated by combining pixel data of each second digital image with the one or more respective signals generated for the same second digital image. This can be done by, for example, concatenating the pixel data of each second digital image with the one or more respective signals generated for the same second digital image.

At step 1203, the input data generated with or without the pixel data for each second digital image is fed to the machine learning machine to train the machine learning model to produce output data indicative of whether an image of a document contains anomalies or not.

As can be seen from the process in FIG. 12, the machine learning model may be trained even where there is only a limited number, for example, only a handful, of documents in a class of documents is available. That is, an advantage of training the machine learning model using the selected signal processing algorithms is that anomalous images of documents are detected with very high accuracy even when there is limited training data. This makes the methods of the present disclosure highly scalable.

The machine learning model can, for example, be one or more artificial neural networks (ANN)—for example, deep artificial neural networks (DNN) or a convolutional neural networks (CNN), support vector machines (SVM), random forests or an isolation forests. Artificial neural networks— for example, recurrent neural networks—represent a specific parametrization of a non-linear function (in terms of network weights). It will be appreciated that the present disclosure is not limited by the language used to describe the non-linear function or its structure. It will be understood that an artificial neural network in the context of a computer implemented invention refers to a physical entity that exists either in terms of a physical state of a general purpose or specifically adapted computing platform or in a specifically adapted physical circuitry, for example.

Artificial neural networks (ANN) may be trained using a class of machine learning algorithms which characteristically use a cascade of multiple layers of nonlinear processing units for extracting features, where each successive layer uses the output from the previous layer as input—that is training a deep neural network (DNN). One suitable DNN for use with the disclosed method is described in K. Simonyan and A. Zisserman, "Very Deep Convolutional Networks for Large-Scale Image Recognition," arXiv: 1409.1556 [cs.CV], 4 Sep. 2014, which is incorporated herein by reference.

Recalling that a second digital image of a document in the second set of digital images of documents is an image of at least a region of that document, where the region comprises a portion of or the whole respective document, a respective machine learning model is trained for each region using the methods outlined in FIGS. 1-12. That is, where the document comprises a plurality of regions, the steps outlined in FIGS. 1-12 are repeated for the plurality of regions of each document in the second set of digital images of documents to provide the respective input data for each region for the respective machine learning model. Optionally, the respective input data for each region are combined to obtain combined input data and the machine learning model can be trained using the combined input data to produce output data indicative of whether or not a digital image of a document in the class of documents contains an anomaly.

Taking the example of a California driver's license, with reference to FIG. 11, input data that correspond to different regions of the license are generated. In this particular example, input data is generated for nine regions of the driver's license, e.g., the signature strip, the hologram, etc. All or a part of these input data may then be combined to provide a single input for training the machine learning model so that the trained machine learning model can detect anomalies in California driver's licenses.

Figure 13:
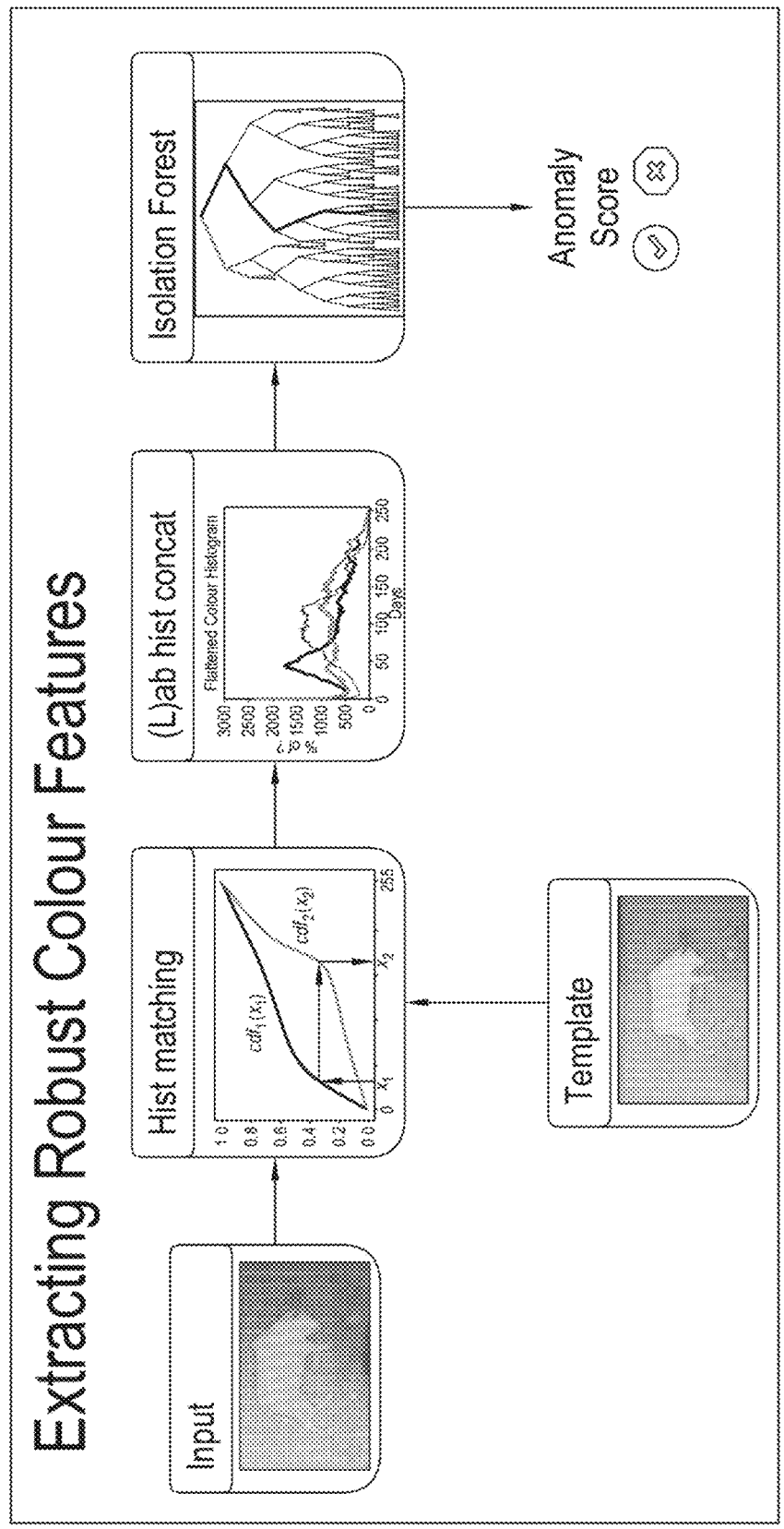
FIG. 13 shows an example of how a selected signal processing algorithm that uses color information is used to train the machine learning model.
Figure 14:
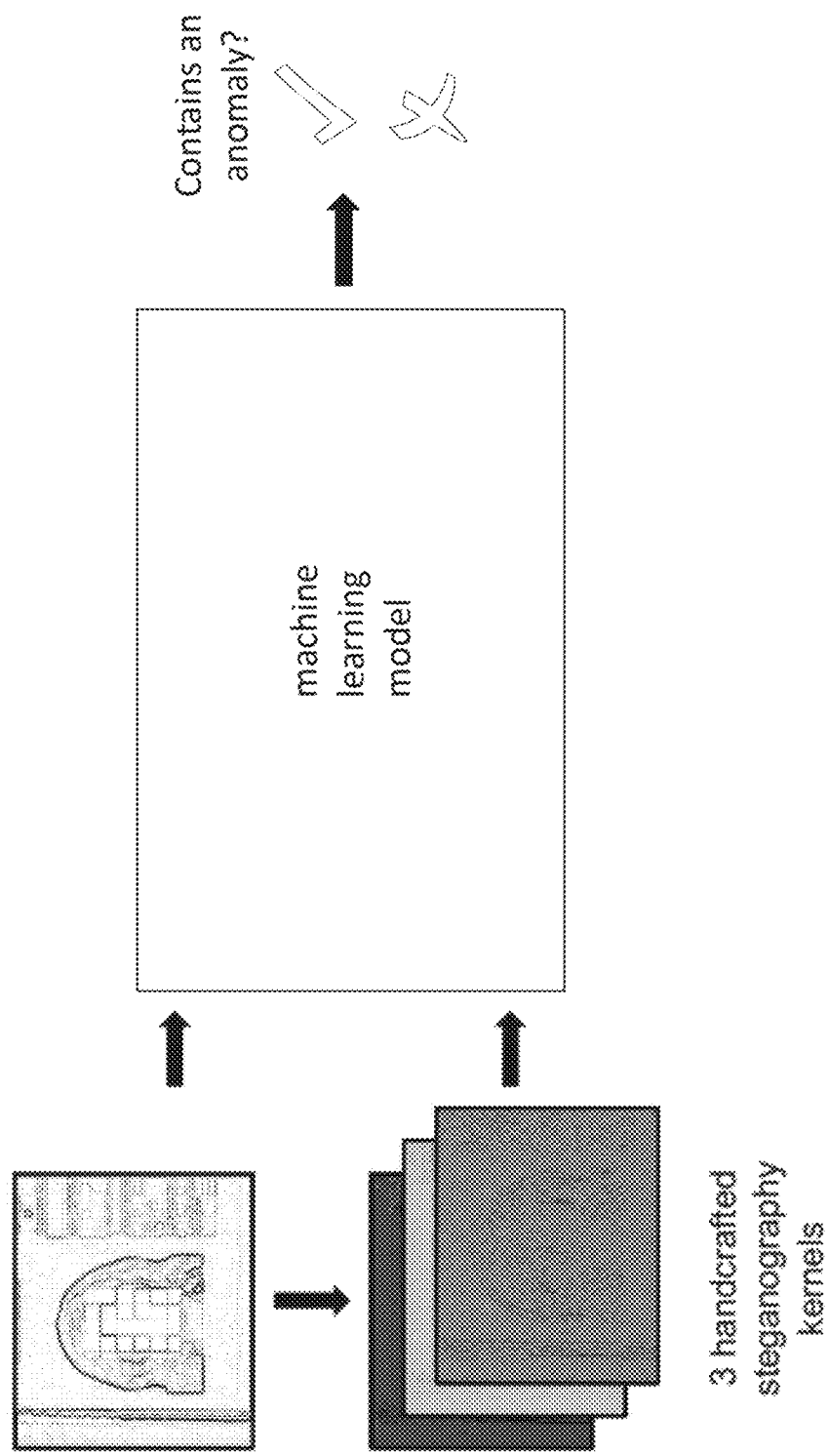
FIG. 14 shows an example of using two selected signal processing algorithms to train the machine learning model.

With reference to FIGS. 13 and 14, examples of how selected signal processing algorithm(s) may be used to train the machine learning model are presented.

With reference to FIG. 13, applying the selected signal processing algorithm applied to a second digital image of (a region) of an official document includes extracting color information from the second digital image and mapping the color information to a LAB color histogram in the manner described in relation to FIG. 6. In this particular example, the input data for the machine learning model is generated by combining the pixel data for the second digital image with the one or more respective signals generated for the second digital image when the signal processing algorithm is applied to the second digital image. In this example, the histogram matching refers to the transformation of an image so that its histogram matches a specified histogram and may be done by matching the bandwidth and mean of the histogram through a gain and offset transformation. In this example, training of the machine learning model is done using an isolation forest algorithm (as described in F. T. Liu et al., "Isolation Forest," 2008 Eighth IEEE International Conference on Data Mining, Dec. 15-19, 2008, pp. 413-422, which is incorporated herein by reference). Isolation forest is an unsupervised learning algorithm for anomaly detection that works on the principle of isolating anomalies, instead of the most common techniques of profiling normal points.

With reference to FIG. 14, an example of training the machine learning model is presented. Here, two signal processing algorithms are selected to be applied to the second digital images of an official document. The first selected algorithm includes extracting color information from the second digital image and mapping the color information to a color histogram in the manner described in relation to FIG. 6. The second selected algorithm involves applying filters—for example, three kernels—in the manner of FIG. 2.

The respective signals obtained from the two signal processing algorithms are combined to provide an input to the machine learning model, which uses a random forest algorithm (as described in Brieman, supra) for training.

Figure 15:
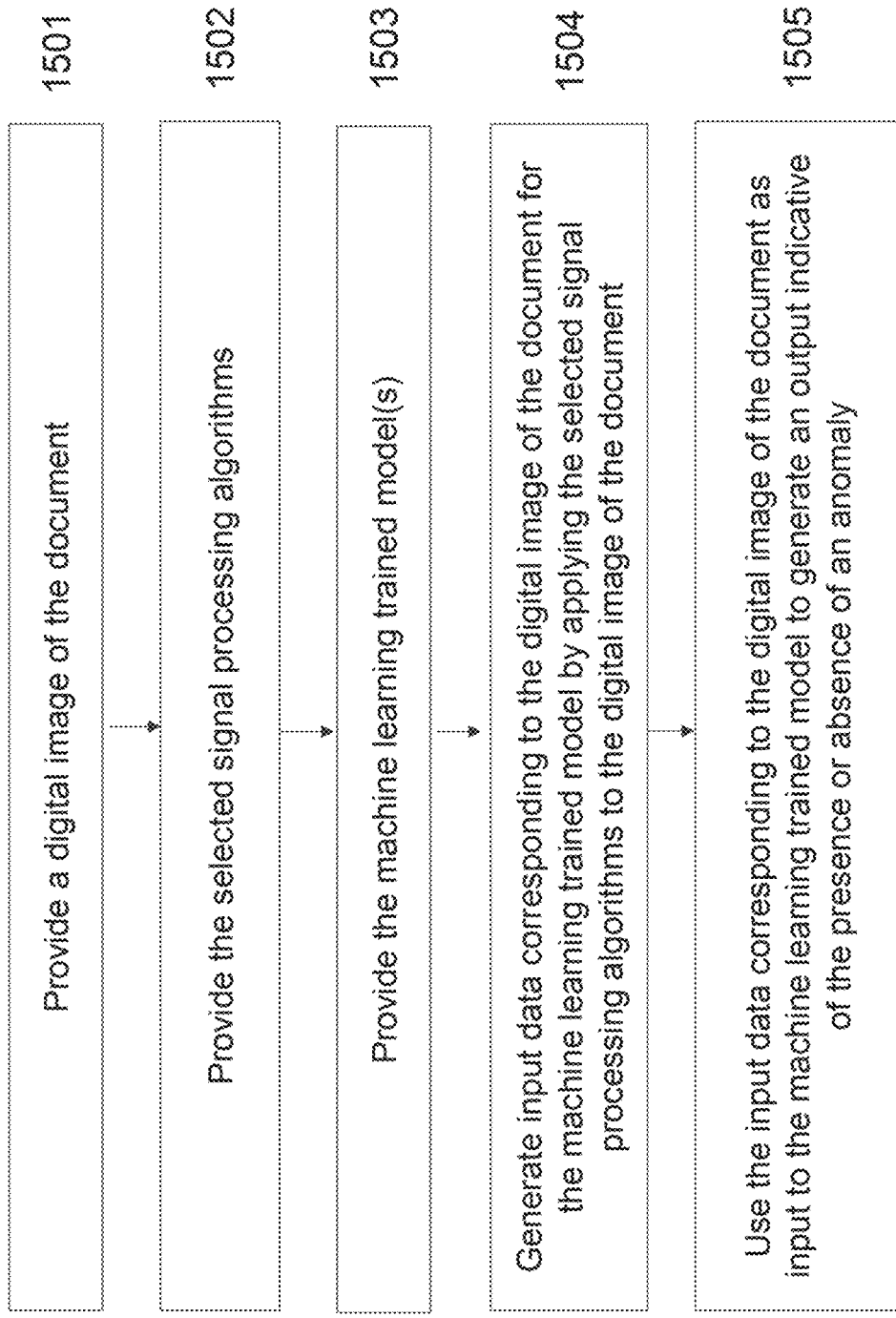
FIG. 15 illustrates a flowchart for detecting anomalies in an image of a document.

Once the machine learning model is trained, it can be used to detect anomalies in a digital image of a document. With reference to FIG. 15, an example process that uses the trained machine learning model to detect anomalies in a digital image of a document is presented. The process begins by providing a digital image of the document along with the selected signal processing algorithms and the trained machine learning models (steps 1501-1503). Where the second digital images are images of a plurality of regions in the documents, the trained machine learning model(s) can be a single model that is trained using combined inputs from the plurality of regions of the documents or there can be several models, each trained for one region of the documents. Therefore, at inference time, the chosen signal processing algorithms as determined in the manner described above will be applied to inference data to generate input data for the one or more machine learning models trained in the manner described above (i.e. during the training stage) to generate an output indicative of the presence or absence of anomalies in the inference data.

The next step is generating input data corresponding to the digital image of the document for the trained machine learning model(s), which is done by applying the selected signal processing algorithms to the digital image of the document (step 1504). The digital image of the document may comprise a plurality of regions, each of which may have one or more corresponding selected signal processing algorithm(s). The input data can be generated for images of each region of the digital image of the document by applying the respective selected signal processing algorithm(s) to images of each region to generate "region input" and then combining the region input data to generate input data that corresponds to the digital image of the document. This input data is then fed to the trained machine learning model, which generates an output to indicate whether or not the digital image of the document contains anomalies (step 1505).

Figure 16:
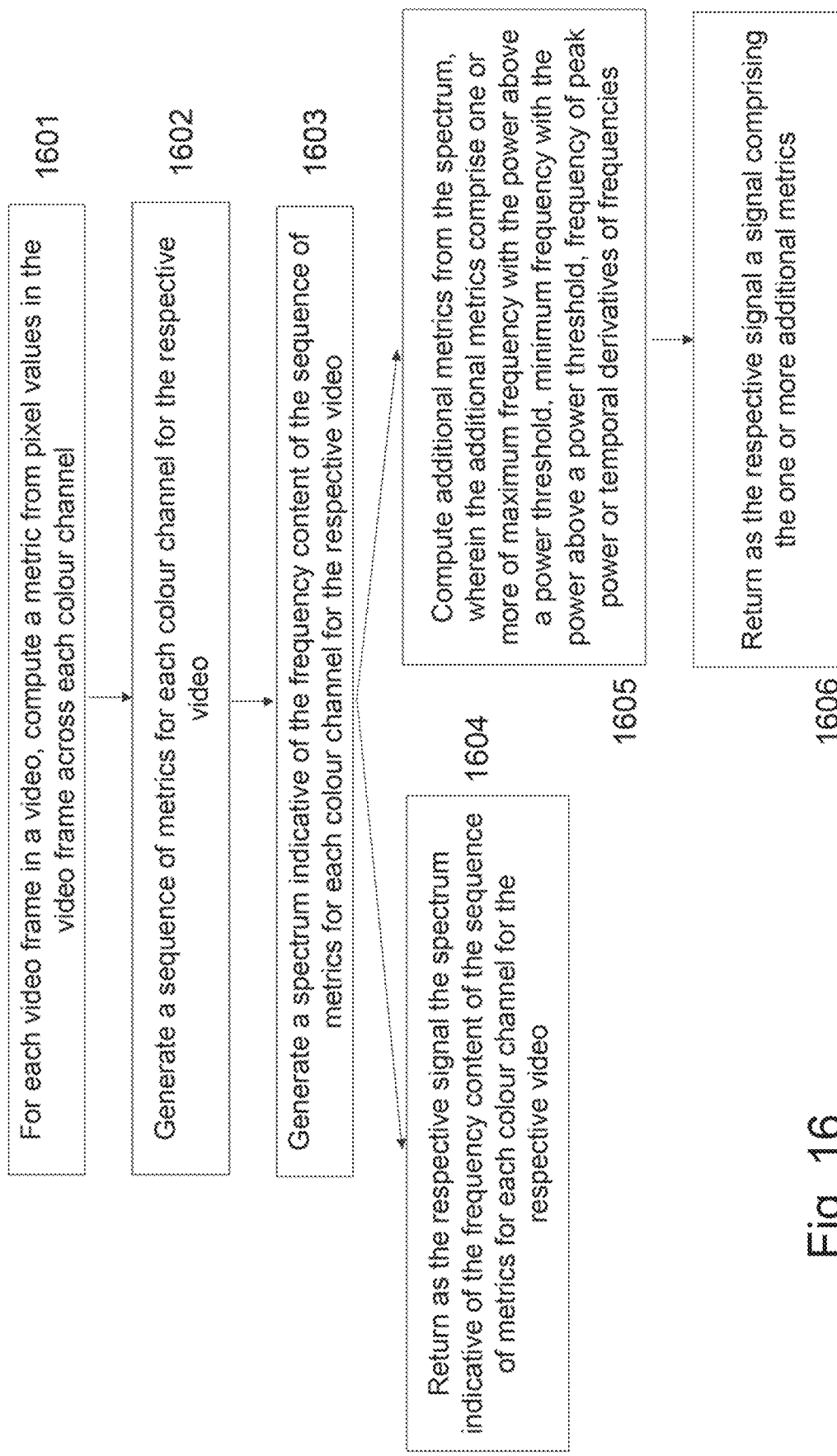
FIG. 16 illustrates a flowchart for applying a spatiotemporal signal processing algorithm.

With reference to FIG. 16, an example of applying a spatio-temporal signal processing algorithm is provided. In this example, each digital image is a video frame of a respective video of a region of a document within the class of documents and the signal processing algorithms comprise one or both of a temporal or a spatio-temporal signal processing algorithm. Here, the process of applying a spatio-temporal signal processing algorithm to each of the digital images begins by computing a metric from pixel values in the video frame across each color channel for each video frame in the respective video (step 1601). The next step is generating a sequence of metrics for each color channel for the respective video (step 1602), followed by generating a spectrum indicative of the frequency content of the sequence of metrics for each color channel for the respective video (step 1603). The process then returns as the respective signal generated from applying the spatio-temporal algorithm the spectrum indicative of the frequency content of the sequence of metrics for each color channel for the respective video (step 1604).

Alternatively or additionally, the process of applying a spatio-temporal signal processing algorithm computes additional metrics from the spectrum, wherein the additional metrics comprise one or more of maximum frequency with the power above a power threshold, minimum frequency with the power above a power threshold, frequency of peak power or temporal derivatives of frequencies (step 1605). Finally, the process then returns as the respective signal generated from applying the spatio-temporal algorithm a signal comprising the one or more additional metrics.

Optionally, the machine learning model may be further trained. Referring back to FIGS. 1A and 1B, the machine learning model trained at step 104 may be further trained by obtaining one or more additional documents of the same class of documents containing an anomaly. Next, a third digital image for each document of the one or more additional documents may be obtained, each third digital image being an image of a region of the respective additional document. Recalling that every first and second digital image is an image of a region of a document in the first set of digital images of documents, the region of the respective additional document is the same as the region of each document of the first and second sets of digital images of documents. The plurality of signal processing algorithms may then be applied to each of the third digital images for each document to generate a respective signal for each third digital image of the one or more additional documents and each signal processing algorithm, and the discriminative power of each signal processing algorithm may be evaluated using the signals for the first digital images and the third digital images generated with the respective signal processing algorithm. Next, based on the discriminative powers of the respective signal processing algorithms, one or more additional signals processing algorithms may be selected from the plurality of signal processing algorithms. New input data for the machine learning model may be generated using one or more respective signals generated by applying the selected one or more of the plurality of signal processing algorithms and the additionally selected one or more signal processing algorithms to each of the plurality of second digital images and, optionally, to each of the plurality of third digital images. Using the new input data, the machine learning model may be further trained to produce output data indicative of whether an image of a document of the class of documents contains an anomaly or not.

Figure 17:
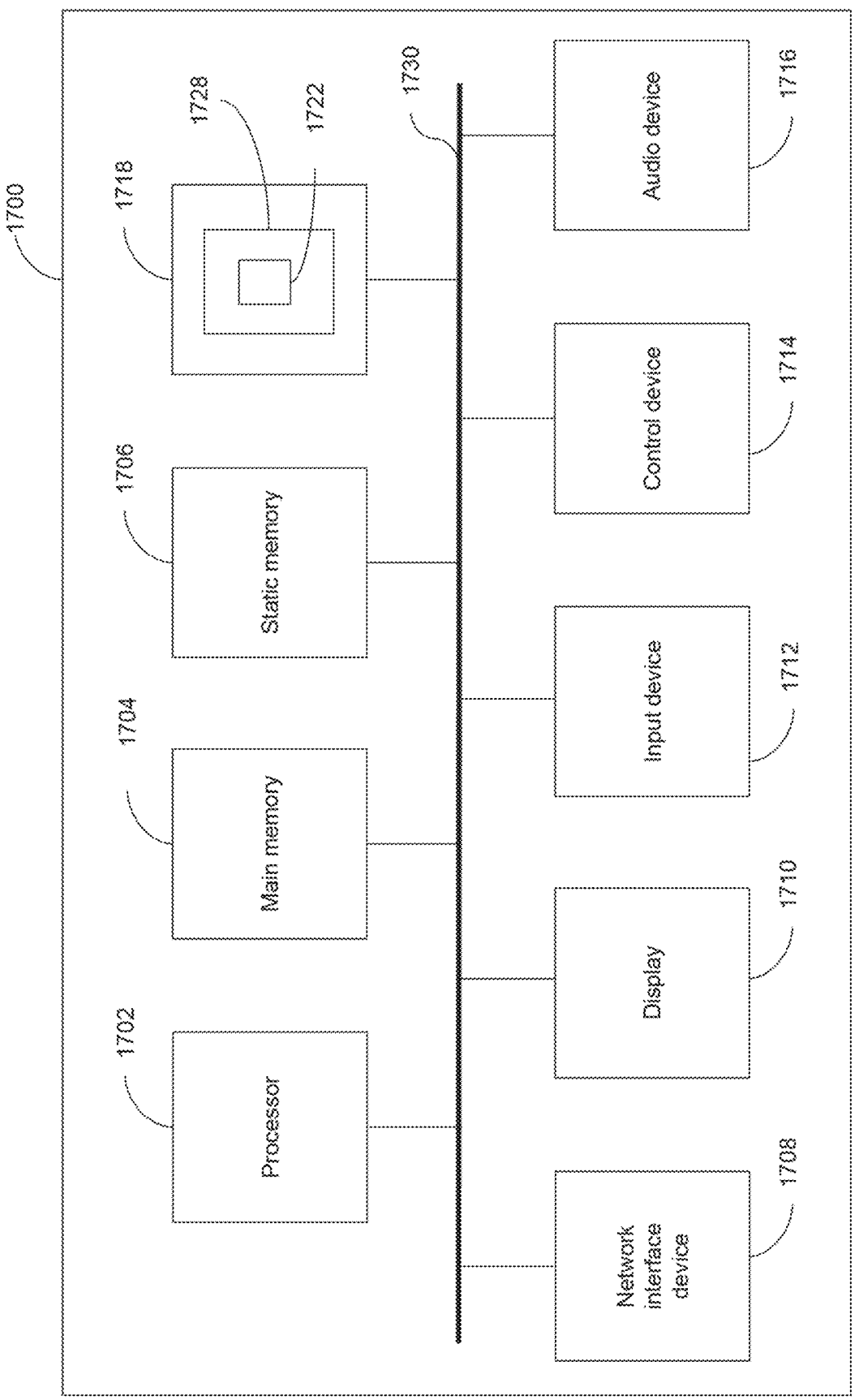
FIG. 17 shows an example implementation of a computing device which may be used to implement the methods of the present disclosure.

FIG. 17 illustrates a block diagram of one implementation of a computing device 1700 within which a set of instructions, for causing the computing device to perform any one or more of the methodologies discussed herein, may be executed. In alternative implementations, the computing device may be connected (e.g., networked) to other machines in a Local Area Network (LAN), an intranet, an extranet, or the Internet. The computing device may operate in the capacity of a server or a client machine in a client-server network environment, or as a peer machine in a peer-to-peer (or distributed) network environment. The computing device may be a personal computer (PC), a tablet computer, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single computing device is illustrated, the term "computing device" shall also be taken to include any collection of machines (e.g., computers) that individually or jointly execute a set (or multiple sets) of instructions to perform any one or more of the methodologies discussed herein.

The example computing device 1700 includes a processing device 1702, a main memory 1704 (e.g., read-only memory (ROM), flash memory, dynamic random access memory (DRAM) such as synchronous DRAM (SDRAM) or Rambus DRAM (RDRAM), etc.), a static memory 1706 (e.g., flash memory, static random access memory (SRAM), etc.), and a secondary memory (e.g., a data storage device 1718), which communicate with each other via a bus 1730.

Processing device 1702 represents one or more general-purpose processors such as a microprocessor, central processing unit, or the like. More particularly, the processing device 1702 may be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 1702 may also be one or more special-purpose processing devices such as an application specific integrated circuit (ASIC), a field programmable gate array (FPGA), a digital signal processor (DSP), network processor, or the like. Processing device 1702 is configured to execute the processing logic (instructions 922) for performing the operations and steps discussed herein.

The computing device 1700 may further include a network interface device 1708. The computing device 1700 also may include a video display unit 1710 (e.g., a liquid crystal display (LCD) or a cathode ray tube (CRT)), an alphanumeric input device 1712 (e.g., a keyboard or touchscreen), a cursor control device 1714 (e.g., a mouse or touchscreen), and an audio device 1716 (e.g., a speaker).

The data storage device 1718 may include one or more machine-readable storage media (or more specifically one or more non-transitory computer-readable storage media) 1728 on which is stored one or more sets of instructions 1722 embodying any one or more of the methodologies or functions described herein. The instructions 1722 may also reside, completely or at least partially, within the main memory 1704 and/or within the processing device 1702 during execution thereof by the computer system 1700, the main memory 1704 and the processing device 1702 also constituting computer-readable storage media.

The various methods described above may be implemented by a computer program. The computer program may include computer code arranged to instruct a computer to perform the functions of one or more of the various methods described above. The computer program and/or the code for performing such methods may be provided to an apparatus, such as a computer, on one or more computer readable media or, more generally, a computer program product. The computer readable media may be transitory or non-transitory. The one or more computer readable media could be, for example, an electronic, magnetic, optical, electromagnetic, infrared, or semiconductor system, or a propagation medium for data transmission, for example for downloading the code over the Internet. Alternatively, the one or more computer readable media could take the form of one or more physical computer readable media such as semiconductor or solid state memory, magnetic tape, a removable computer diskette, a random access memory (RAM), a read-only memory (ROM), a rigid magnetic disc, and an optical disk, such as a CD-ROM, CD-R/W or DVD.

In an implementation, the modules, components and other features described herein can be implemented as discrete components or integrated in the functionality of hardware components such as ASICS, FPGAs, DSPs or similar devices.

A "hardware component" is a tangible (e.g., non-transitory) physical component (e.g., a set of one or more processors) capable of performing certain operations and may be configured or arranged in a certain physical manner. A hardware component may include dedicated circuitry or logic that is permanently configured to perform certain operations. A hardware component may be or include a special-purpose processor, such as a field programmable gate array (FPGA) or an ASIC. A hardware component may also include programmable logic or circuitry that is temporarily configured by software to perform certain operations.

Accordingly, the phrase "hardware component" should be understood to encompass a tangible entity that may be physically constructed, permanently configured (e.g., hardwired), or temporarily configured (e.g., programmed) to operate in a certain manner or to perform certain operations described herein.

In addition, the modules and components can be implemented as firmware or functional circuitry within hardware devices. Further, the modules and components can be implemented in any combination of hardware devices and software components, or only in software (e.g., code stored or otherwise embodied in a machine-readable medium or in a transmission medium).

Unless specifically stated otherwise, as apparent from the following discussion, it is appreciated that throughout the description, discussions utilizing terms such as "obtaining", "determining", "comparing", "extracting", "normalizing," "generating", "providing", "applying", "training", "feeding", "cropping", "mapping", "selecting", "evaluating", "assigning", "computing", "calculating", or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

It is to be understood that the above description is intended to be illustrative, and not restrictive. Many other implementations will be apparent to those of skill in the art upon reading and understanding the above description. Although the present disclosure has been described with reference to specific example implementations, it will be recognized that the disclosure is not limited to the implementations described, but can be practiced with modification and alteration within the spirit and scope of the appended claims. Accordingly, the specification and drawings are to be regarded in an illustrative sense rather than a restrictive sense. The scope of the disclosure should, therefore, be determined with reference to the appended claims, along with the full scope of equivalents to which such claims are entitled.

What is claimed is:

1. A computer implemented method of training a machine learning model for detecting anomalies in images of documents of a class of documents, the method comprising:
    (a) obtaining, for each document, at least one first digital image of a first set of digital images of documents within the class of documents, each first digital image being an image of a region of the respective document comprising a portion of or the whole respective document and the first set of digital images comprising at least one digital image of a document of the class of documents containing an anomaly and at least one digital image of a document of the class of documents not containing an anomaly;
    (b) applying a plurality of signal processing algorithms to each of the first digital images to generate a respective signal for each first digital image of the first set of digital images of documents and each signal processing algorithm;
    (c) evaluating a discriminative power of each signal processing algorithm, wherein the discriminative power is indicative of the power of the signals generated with the respective signal processing algorithm to discriminate digital images of documents of the class of documents containing an anomaly from digital images of documents of the class of documents not containing an anomaly;
    (d) selecting, based on at least the discriminative power of the respective signal processing algorithms, one or more of the plurality of signal processing algorithms;
    (e) generating input data for the machine learning model using one or more respective signals generated by applying the selected one or more of the plurality of signal processing algorithms to each of a plurality of second digital images, wherein each second digital image is an image of the region of a respective document of a second set of digital images of documents within the class of documents and the second set of digital images comprises at least one digital image of a document of the class of documents containing an anomaly and at least one digital image of a document of the class of documents not containing an anomaly; and
    (f) training the machine learning model using the input data to produce output data indicative of whether a digital image of a document of the class of documents contains an anomaly or not, wherein optionally, the first set of digital images of documents is the same as or different from, for example, a subset of, the second set of digital images of documents.

2. The method of claim 1, wherein each first digital image is a video frame of a respective video of the region of the respective document; and each second digital image is a video frame of a respective video of the region of the respective document of the second set of digital images of documents within the class of documents and the signal processing algorithms comprise one or both of a temporal or a spatio-temporal signal processing algorithm.

3. The method of claim 2, wherein applying a signal processing algorithm of the plurality of signal processing algorithms comprises applying a spatio-temporal signal processing algorithm to each of the first digital images and second digital images, wherein applying a spatio-temporal signal processing algorithm comprises:

for each video frame in the respective video, computing a metric from pixel values in the video frame across each color channel;
generating a sequence of metrics for each color channel for the respective video; and
generating a spectrum indicative of the frequency content of the sequence of metrics for each color channel for the respective video.

4. The method of claim 3, wherein the respective signal is the spectrum indicative of the frequency content of the sequence of metrics for each color channel for the respective video.

5. The method of claim 3, wherein applying a spatio-temporal signal processing algorithm further comprises:
computing additional metrics from the spectrum, wherein the additional metrics comprise one or more of maximum frequency with the power above a power threshold, minimum frequency with the power above a power threshold, frequency of peak power or temporal derivatives of frequencies, wherein the respective signal comprises the one or more additional metrics.

6. The method of claim 1, wherein applying a signal processing algorithm of the plurality of signal processing algorithms to each of the first digital images comprises applying a filter that models a local noise pattern to each first digital image to obtain a filtered first digital image as the respective signal for each first digital image, and wherein applying the filter comprises convolving a kernel with each first digital image.

7. The method of claim 6, wherein the input data is generated using the respective signals generated for each first digital image.

8. The method of claim 1, wherein applying a signal processing algorithm of the plurality of signal processing algorithms comprises applying frequency analysis to each of the first digital images, wherein applying frequency analysis comprises:
extracting spatial frequency information from each first digital image;
normalizing the spatial frequency information; and
generating a signal indicative of respective normalized spatial frequency information in each of a plurality of spatial frequency bands.

9. The method of claim 1, wherein applying a signal processing algorithm of the plurality of signal processing algorithms comprises extracting one or more edges of each of the first digital images to generate the respective signal for each first digital image.

10. The method of claim 9, wherein extracting one or more edges of each of the first digital images comprises:
feeding each of the first digital images to a convolutional neural network to detect a plurality of corners of the first digital image;
cropping each of the first digital images around the detected plurality of corners of the first digital image;
applying edge detection to each of the cropped first digital images; and
extracting an image of the plurality of corners of each of the first digital images to generate the respective signal for each first digital image.

11. The method of claim 1, wherein applying a signal processing algorithm of the plurality of signal processing algorithms comprises extracting color information from the first digital image; and mapping the color information to one or more color histograms to generate the respective signal for each first digital image.

12. The method of claim 11, wherein the one or more color histograms comprise one or more of a Commission Internationale de léclairage L*a*b (LAB), hue-saturation-lightness (HSL), hue-saturation-value (HSV), red-green-blue (RGB), or greyscale histogram.

13. The method of claim 11, wherein the one or more color histograms comprise two or more of a Commission Internationale de léclairage L*a*b (LAB), hue-saturation-lightness (HSL), hue-saturation-value (HSV), red-green-blue (RGB), or greyscale color histogram.

14. The method of claim 1, wherein evaluating the discriminative power of a respective signal processing algorithm is based on a distance measure between the signals generated with the respective signal processing algorithm for each first digital image of the at least one digital image of the document of the class of documents not containing an anomaly and the signals generated with the respective signal processing algorithm for each first digital image of the at least one digital image of the document of the class of documents containing an anomaly.

15. The method of claim 1, the method further comprising:
obtaining one or more additional documents of the class of documents containing an anomaly;
obtaining a third digital image for each document of the one or more additional documents, each third digital image being an image of a region of the respective document, wherein the region of the respective document is the same as the region of each document of the first and second sets of digital images of documents;
applying the plurality of signal processing algorithms to each of the third digital images for each document to generate a respective signal for each third digital image of the one or more additional documents and each signal processing algorithm;
evaluating the discriminative power of each signal processing algorithm using the signals for the first digital images and the third digital images generated with the respective signal processing algorithm;
selecting, based on respective discriminative powers of the respective signal processing algorithms, one or more additional signals processing algorithms from the plurality of signal processing algorithms;
generating new input data for the machine learning model using one or more respective signals generated by applying the selected one or more of the plurality of signal processing algorithms and the additionally selected one or more signal processing algorithms to each of the plurality of second digital images and, optionally, to each of the plurality of third digital images; and
further training the machine learning model using the new input data to produce output data indicative of whether an image of a document of the class of documents contains an anomaly or not.

16. The method of claim 1, wherein generating input data comprises:
if the number of images in the plurality of second digital images is below a first threshold, generating the input data without pixel data of each second digital image; and
if the number of images in the plurality of second digital images is above the first threshold, generating the input data by combining the pixel data with the one or more respective signals generated for the same second digital image, including concatenating the pixel data of each second digital image with the one or more respective signals generated for the same second digital image.

17. The method of claim 1, wherein the region of each document of the first and second sets of digital images of documents is one of a plurality of regions of each document and wherein the method further comprises repeating steps (a) to (f) for each remaining one of the plurality of regions to train a respective machine learning model for each region.

18. The method of claim 17, further comprising combining respective input data for each region to obtain combined input data, wherein step (f) further comprises training the machine learning model using the combined input data to produce output data indicative of whether a digital image of a document of the class of documents contains anomalies or not.

19. The method of claim 17, wherein the document comprises a plurality of regions and wherein:
the method comprises repeating steps (i)-(iv) for each of the plurality of regions; and
step (iii) further comprises generating region input data corresponding to each region in the plurality of regions for the one or more trained machine learning models by applying the selected one or more of the plurality of signal processing algorithms to a respective region of plurality of regions and combining the region input data to generate the input data corresponding to the document.

20. A computer-implemented method of detecting anomalies in an image of a document of a class of documents, the method comprising:
(i) providing the selected one or more of the plurality of signal processing algorithms according to claim 1;
(ii) providing one or more machine learning models trained according to claim 1;
(iii) generating input data corresponding to a digital image of the document for the one or more trained machine learning models by applying the selected one or more of the plurality of signal processing algorithms to the digital image of the document; and
(iv) using the input data corresponding to the digital image of the document as input to the one or more machine learning trained models to generate an output indicative of the presence or absence of anomalies.

* * * * *